(12) United States Patent
Srivastava et al.

(10) Patent No.: US 9,497,090 B2
(45) Date of Patent: *Nov. 15, 2016

(54) METHODS AND APPARATUS TO DETERMINE AN ADJUSTMENT FACTOR FOR MEDIA IMPRESSIONS

(71) Applicant: The Nielsen Company (US), LLC, Schaumburg, IL (US)

(72) Inventors: Seema Varma Srivastava, Sunnyvale, CA (US); James R. Oliver, San Carlos, CA (US); Paul Donato, New York, NY (US); Mainak Mazumdar, Brooklyn, NY (US); Juliette Aurisset, Menlo Park, CA (US); Kumar Nagaraja Rao, Sunnyvale, CA (US); Albert R. Perez, San Francisco, CA (US); Josh Gaunt, Sunnyvale, CA (US); Yutao Peng, Cupertino, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,309

(22) Filed: Aug. 19, 2014

(65) Prior Publication Data
US 2014/0358676 A1 Dec. 4, 2014

Related U.S. Application Data

(63) Continuation of application No. 13/756,493, filed on Jan. 31, 2013, which is a continuation of application No. PCT/US2012/026760, filed on Feb. 27, 2012.

(60) Provisional application No. 61/454,326, filed on Mar. 18, 2011.

(51) Int. Cl.
*G06F 15/173* (2006.01)
*H04L 12/26* (2006.01)
(Continued)

(52) U.S. Cl.
CPC ......... *H04L 43/04* (2013.01); *G06F 17/30038* (2013.01); *G06F 17/30876* (2013.01);
(Continued)

(58) Field of Classification Search
CPC ..... H04L 43/04; H04L 67/22; H04N 21/812; G06Q 30/0201; G06Q 30/0241; G06Q 30/0251
USPC ............... 709/217–219, 223–224, 227–228, 709/245–246
See application file for complete search history.

(56) References Cited

U.S. PATENT DOCUMENTS

| 3,540,003 | A | 11/1970 | Murphy |
|---|---|---|---|
| 3,818,458 | A | 6/1974 | Deese |

(Continued)

FOREIGN PATENT DOCUMENTS

| AU | 2013205736 | 5/2013 |
|---|---|---|
| CN | 101077014 | 11/2007 |

(Continued)

OTHER PUBLICATIONS

The State Intellectual Property Office of China, "First Notification of Office Action," issued in connection with application No. CN 201280003504.8, on Apr. 1, 2015, with English translation, 17 pages.

(Continued)

*Primary Examiner* — Bharat N Barot
(74) *Attorney, Agent, or Firm* — Hanley, Flight and Zimmerman, LLC

(57) ABSTRACT

Examples to determine media impressions are disclosed. An example method includes determining an exposure of first media, wherein the exposure occurs after a cookie identifier is received at a computing device, wherein the cookie identifier is received from a database proprietor, determining a first panelist identifier associated with the exposure based on the cookie identifier, determining a second panelist identifier associated with the exposure based on a determination of a user identity by a panelist meter associated with the computing device, determining an adjustment factor by comparing the first panelist identifier and the second panelist identifier, determining a number of impressions of second media from data logged by the database proprietor, the data logged in response to requests transmitted to the database proprietor in response to clients accessing the second media, and applying the adjustment factor to the number of impressions to determine an adjusted number of impressions.

39 Claims, 19 Drawing Sheets

(51) Int. Cl.
*H04L 29/08* (2006.01)
*H04N 21/81* (2011.01)
*G06Q 30/02* (2012.01)
*G06F 17/30* (2006.01)

(52) U.S. Cl.
CPC ...... *G06Q30/0201* (2013.01); *G06Q 30/0241* (2013.01); *G06Q 30/0246* (2013.01); *G06Q 30/0251* (2013.01); *G06Q 30/0277* (2013.01); *H04L 67/22* (2013.01); *H04N 21/812* (2013.01)

(56) References Cited

U.S. PATENT DOCUMENTS

| | | |
|---|---|---|
| 3,906,450 A | 9/1975 | Prado, Jr. |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,621,325 A | 11/1986 | Naftzger et al. |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,712,097 A | 12/1987 | Hashimoto |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,754,262 A | 6/1988 | Hackett et al. |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,970,644 A | 11/1990 | Berneking et al. |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,113,518 A | 5/1992 | Durst, Jr. et al. |
| 5,182,770 A | 1/1993 | Medveczky et al. |
| 5,204,897 A | 4/1993 | Wyman |
| 5,214,780 A | 5/1993 | Ingoglia et al. |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,848,396 A | 12/1998 | Gerace |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,164,975 A | 12/2000 | Weingarden et al. |
| 6,223,215 B1 | 4/2001 | Hunt et al. |
| 6,247,050 B1 | 6/2001 | Tso et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,363,643 B2 | 4/2008 | Drake et al. |
| 7,386,473 B2 | 6/2008 | Blumenau |
| 7,406,516 B2 | 7/2008 | Davis et al. |
| 7,526,538 B2 | 4/2009 | Wilson |
| 7,546,370 B1 | 6/2009 | Acharya et al. |
| 7,590,568 B2 | 9/2009 | Blumenau |
| 7,600,014 B2 | 10/2009 | Russell et al. |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,032,626 B1 | 10/2011 | Russell et al. |
| 8,131,861 B2 | 3/2012 | Butler et al. |
| 8,151,194 B1 | 4/2012 | Chan et al. |
| 8,180,112 B2 | 5/2012 | Kurtz et al. |
| 8,229,780 B2 | 7/2012 | Davidow et al. |
| 8,234,408 B2 | 7/2012 | Jungck |
| 8,266,687 B2 | 9/2012 | Baldry |
| 8,271,886 B2 | 9/2012 | Lee et al. |
| 8,280,683 B2 | 10/2012 | Finkler |
| 8,307,006 B2 | 11/2012 | Hannan et al. |
| 8,370,489 B2 | 2/2013 | Mazumdar et al. |

(56) References Cited

U.S. PATENT DOCUMENTS

| | | |
|---|---|---|
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,549,552 B2 | 10/2013 | Ramaswamy et al. |
| 8,600,796 B1 | 12/2013 | Sterne et al. |
| 8,688,524 B1 | 4/2014 | Ramalingam et al. |
| 8,713,168 B2 | 4/2014 | Heffernan et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 * | 12/2014 | Heath .................... G06Q 30/02 709/224 |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,117,217 B2 | 8/2015 | Wilson et al. |
| 2002/0099609 A1 | 7/2002 | Nascenzi et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0074252 A1 | 4/2003 | Chandler-Pepelnjak et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0098229 A1 | 5/2004 | Error et al. |
| 2004/0107125 A1 | 6/2004 | Guheen et al. |
| 2004/0167763 A1 | 8/2004 | Liebman |
| 2004/0186840 A1 | 9/2004 | Dettinger et al. |
| 2005/0033657 A1 | 2/2005 | Herrington et al. |
| 2005/0223093 A1 | 10/2005 | Hanson et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0271641 A1 | 11/2006 | Stavrakos et al. |
| 2006/0294259 A1 | 12/2006 | Matefi et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2008/0004958 A1 | 1/2008 | Ralph et al. |
| 2008/0086523 A1 | 4/2008 | Afergan et al. |
| 2008/0088152 A1 | 4/2008 | Rietdijk |
| 2008/0126420 A1 | 5/2008 | Wright et al. |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0217315 A1 | 8/2009 | Malik et al. |
| 2009/0292587 A1 | 11/2009 | Fitzgerald |
| 2009/0307084 A1 | 12/2009 | Monighetti et al. |
| 2010/0004977 A1 | 1/2010 | Marci et al. |
| 2010/0010866 A1 | 1/2010 | Bal et al. |
| 2010/0076814 A1 | 3/2010 | Manning |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0281178 A1 | 11/2010 | Sullivan |
| 2010/0299604 A1 | 11/2010 | Blumenau |
| 2010/0312854 A1 | 12/2010 | Hyman |
| 2011/0016482 A1 | 1/2011 | Tidwell et al. |
| 2011/0041062 A1 | 2/2011 | Singer et al. |
| 2011/0087519 A1 | 4/2011 | Fordyce, III et al. |
| 2011/0087919 A1 | 4/2011 | Deshmukh et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0157475 A1 | 6/2011 | Wright et al. |
| 2011/0191664 A1 | 8/2011 | Sheleheda et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005015 A1 | 1/2012 | Park et al. |
| 2012/0005213 A1 | 1/2012 | Hannan et al. |
| 2012/0030037 A1 | 2/2012 | Carriero |
| 2012/0042005 A1 * | 2/2012 | Papakostas et al. .......... 709/217 |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239809 A1 | 9/2012 | Mazumdar et al. |
| 2012/0254466 A1 | 10/2012 | Jungck |
| 2012/0302222 A1 | 11/2012 | Williamson et al. |
| 2012/0311017 A1 | 12/2012 | Sze et al. |
| 2013/0007794 A1 | 1/2013 | Besehanic et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0117103 A1 | 5/2013 | Shimizu et al. |
| 2013/0138506 A1 | 5/2013 | Zhu et al. |
| 2013/0145022 A1 * | 6/2013 | Srivastava et al. ........... 709/224 |
| 2013/0159499 A1 * | 6/2013 | Besehanic ............ H04L 61/1511 709/224 |
| 2013/0198125 A1 | 8/2013 | Oliver et al. |
| 2013/0204694 A1 | 8/2013 | Banister et al. |
| 2013/0212188 A1 | 8/2013 | Duterque et al. |
| 2013/0246609 A1 | 9/2013 | Topchy et al. |
| 2013/0262181 A1 | 10/2013 | Topchy et al. |
| 2013/0282898 A1 | 10/2013 | Kalus et al. |
| 2013/0297411 A1 | 11/2013 | van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0058836 A1 | 2/2014 | Wiseman et al. |
| 2014/0075004 A1 | 3/2014 | Van Dusen et al. |
| 2014/0108130 A1 * | 4/2014 | Vos .................... G06Q 30/0246 705/14.45 |
| 2014/0122703 A1 | 5/2014 | Pugh et al. |
| 2014/0156761 A1 | 6/2014 | Heffernan et al. |
| 2014/0173646 A1 | 6/2014 | Ramaswamy |
| 2014/0279074 A1 | 9/2014 | Chen et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0325551 A1 * | 10/2014 | McMillan ........ H04N 21/25841 725/20 |
| 2014/0337104 A1 | 11/2014 | Splaine et al. |

(56) References Cited

U.S. PATENT DOCUMENTS

| | | | |
|---|---|---|---|
| 2015/0019322 | A1 | 1/2015 | Alla et al. |
| 2015/0046579 | A1 | 2/2015 | Perez et al. |
| 2015/0193816 | A1 | 7/2015 | Toupet et al. |
| 2015/0262207 | A1 | 9/2015 | Rao et al. |

FOREIGN PATENT DOCUMENTS

| | | |
|---|---|---|
| CN | 101222348 | 7/2008 |
| CN | 101505247 | 8/2009 |
| EP | 0325219 | 7/1989 |
| EP | 0703683 | 3/1996 |
| EP | 0744695 | 11/1996 |
| EP | 1379044 | 1/2004 |
| GB | 2176639 | 12/1986 |
| JP | 5324352 | 12/1993 |
| JP | 07262167 | 10/1995 |
| JP | 2001282982 | 10/2001 |
| JP | 2001357192 | 12/2001 |
| JP | 2002-091852 | 3/2002 |
| JP | 2002373152 | 12/2002 |
| JP | 2003-067289 | 3/2003 |
| JP | 2004504674 | 2/2004 |
| JP | 2006127320 | 5/2006 |
| JP | 2006127321 | 5/2006 |
| JP | 2007052633 | 3/2007 |
| JP | 2008-234641 | 10/2008 |
| JP | 2010039845 | 2/2010 |
| JP | 2010257448 | 11/2010 |
| JP | 2012-093970 | 5/2012 |
| KR | 10-2002-0037980 | 5/2002 |
| KR | 20120091411 | 8/2002 |
| KR | 20110023293 | 3/2011 |
| KR | 20120123148 | 11/2012 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 98/09447 | 3/1998 |
| WO | 0041115 | 7/2000 |
| WO | 01/52168 | 7/2001 |
| WO | 01/54034 | 7/2001 |
| WO | 0207054 | 1/2002 |
| WO | 03027860 | 4/2003 |
| WO | 2005024689 | 3/2005 |
| WO | 2010/083450 | 7/2010 |
| WO | 2010088372 | 8/2010 |
| WO | 2010104285 | 9/2010 |
| WO | 2011097624 | 8/2011 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | WO2013122907 | 8/2013 |
| WO | 2013188429 | 12/2013 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |

OTHER PUBLICATIONS

IP Australia, "Notice of Acceptance" issued in connection with Application No. 2012231667, May 15, 2015, 3 pages.
United States Patent and Trademark Office, "Non-Final Office Action," issued in connection with U.S. Appl. No. 14/014,050, May 28, 2015, 20 pages.
Japanese Patent Office, "Notice of Allowance" with English translation, issued in connection with application No. JP 2013-544887, on May 27, 2015, 5 pages.
IP Australia, "Notice of Acceptance," issued in connection with Application No. 2013204865, Jun. 30, 2015, 2 pages.
Japanese Patent Office, "Notice of Reasons for Rejection," issued in connection with application No. JP 2013-529435, on Aug. 20, 2013, 4 pages.
United States Patent and Trademark Office, "Non-Final Office Action," issued in connection with U.S. Appl. No. 13/209,292, on Apr. 8, 2014, 19 pages.
United States Patent and Trademark Office, "Notice of Allowance," issued in connection with U.S. Appl. No. 13/690,915, on Apr. 9, 2014, 28 pages.
International Searching Authority, "International Search Report and Written Opinion of the International Searching Authority," issued in connection with application No. PCT/US2013/025687, mailed on Jun. 2, 2013, 10 pages.
Japanese Patent Office, "Notice of Reasons for Rejection," issued in connection with application No. JP 2014-005867, on Apr. 15, 2014, 10 pages.
State Intellectual Property Office of China, "First Office Action," issued in connection with application No. CN 201180061437.0, on Mar. 7, 2014, 6 pages.
Chloe Albanesius, Facebook Issues Fix for Several Tracking Cookies, internet article, www.pcmag.com, Sep. 28, 2011, 2 pages.
Emil Protalinski, Facebook denies cookie tracking allegations, internet article, www.zdnet.com, Sep. 25, 2011, 2 pages.
Emil Protalinski, Facebook fixes cookie behavior after logging out, internet article, www.zdnet.com, Sep. 27, 2011, 2 pages.
Emil Protalinski, US congressmen ask FTC to investigate Facebook cookies, internet article, www.zdnet.com, Sep. 28, 2011, 2 pages.
International Bureau, "International Preliminary Report on Patentability," issued in connection with PCT application Serial No. PCT/US2011/052623, issued Mar. 26, 2013 (5 pages).
Launder, "Media Journal: Nielsen to Test Online-TV Viewing Tool," The Wall Street Journal, Apr. 30, 2013, 2 pages.
Nik Cubrilovic, Logging out of Facebook is not enough, internet article, www.nikcub.appspot.com, Sep. 25, 2011, 3 pages.
Sharma, Amol, "Nielsen Gets Digital to Track Online TV Viewers," All Things, Apr. 30, 2013, 3 pages.
United States Patent and Trademark Office, "Notice of Allowance," issued in connection with U.S. Appl. No. 13/239,005, on Nov. 27, 2013, 46 pages.
Australian Government, IP Australia, "Examination Report," issued in connection with application No. AU 2012231667, on Mar. 18, 2014, 2 pages.
United States Patent and Trademark Office, "Notice of Allowance," issued in connection with U.S. Appl. No. 13/691,175, on Jan. 27, 2014, 35 pages.
United States Patent and Trademark Office, "Final Office Action," issued in connection with U.S. Appl. No. 13/690,915, on Dec. 20, 2013, 18 pages.
Australian Government, IP Australia, "Examination Report," issued in connection with application No. AU 2013205736, on Jun. 18, 2013, 2 pages.
Fliptop, "Fliptop Person API Documentation," https://developer.fliptop.com/documentation, retrieved on May 7, 2013 (6 pages).
Fliptop, "Get, Keep and Grow Customers with Fliptop's Customer Intelligence Application," www.fliptop.com/features#social_matching, retrieved on May 7, 2013 (3 pages).
Fliptop, "What is Fliptop?", www.fliptop.com/about_us, retrieved on May 7, 2013 (1 page).
Rapleaf, "Fast. Simple. Secure," www.rapleaf.com/why-rapleaf/, retrieved on May 7, 2013 (3 pages).
Rapleaf, "Frequently Asked Questions," www.rapleaf.com/about-us/faq/#where, retrieved on May 7, 2013 (3 pages).
Rapleaf, "The Consumer Data Marketplace," www.rapleaf.com/under-the-hood/, retrieved on May 7, 2013 (2 pages).
Rainier, Maria, "Why Businesses Should Use Google Plus," The Social Media Guide, thesocialmediaguide.com/social_media/why-businesses-should-use-google-plus, retrieved on May 7, 2013 (9 pages).
Vega, Tanzina, "Nielsen Introduces New Ad Measurement Product," The New York Times, Sep. 27, 2010 (7 pages).

(56) References Cited

OTHER PUBLICATIONS

Webmaster World, JavaScript and AJAX Forum, Sep. 28, 2005, http://www.webmasterworld.com/forum91/4465.htm, retrieved on Jun. 29, 2011 (4 pages).
Vranica, Suzanne, "Nielsen Testing a New Web-Ad Metric," The Wall Street Journal, Sep. 23, 2010 (2 pages).
Wikipedia, "Mental Poker," Jan. 12, 2010, http://en.wikipedia.org/wiki/Mental_poker, retrieved on Sep. 21, 2010 (5 pages).
The Nielsen Company, "Nielsen Unveils New Online Advertising Measurement," Sep. 27, 2010, http://nielsen.com/us/en/insights/press-room/2010/nielsen_unveils_newonlineadvertisingmeasurement.html, retrieved on May 31, 2012 (3 pages).
Adam et al., "Privacy Preserving Integration of Health Care Data," AMIA 2007 Symposium Proceedings (6 pages). [The year of publication is sufficiently earlier than the effective U.S. filing date and any foreign priority date (if applicable) so that the particular month of publication is not in issue.].
Coffey, Steve, "Internet Audience Measurement: A Practitioner's View," Journal of Interactive Advertising, vol. 1, No. 2, Spring 2001, pp. 10-17, American Academy of Advertising (8 pages).
International Searching Authority, "International Search Report," issued in connection with application No. PCT/US2011/052623, mailed on Mar. 8, 2012 (3 pages).
International Searching Authority, "Written Opinion," issued in connection with application No. PCT/US2011/052623, mailed on Mar. 8, 2012 (4 pages).
International Searching Authority, "International Search Report," issued in connection with application No. PCT/US2011/065881, mailed on Jul. 9, 2012 (3 pages).
International Searching Authority, "Written Opinion," issued in connection with application No. PCT/US2011/065881, mailed on Jul. 9, 2012 (6 pages).
International Searching Authority, "International Search Report," issued in connection with application No. PCT/US2011/052762, mailed on Aug. 22, 2012 (3 pages).
International Searching Authority, "Written Opinion," issued in connection with application No. PCT/US2011/052762, mailed on Aug. 22, 2012 (4 pages).
International Searching Authority, "International Search Report," issued in connection with application No. PCT/US2012/026760, mailed on Jan. 2, 2013 (3 pages).
International Searching Authority, "Written Opinion," issued in connection with application No. PCT/US2012/026760, mailed on Jan. 2, 2013 (3 pages).
United States Patent and Trademark Office, "Notice of Allowance," issued in connection with U.S. Appl. No. 13/513,148, on Nov. 5, 2012 (27 pages).
IP Australia, "Patent Examination Report No. 1," issued in connection with application No. AU2013205736, on Jun. 18, 2013 (2 pages).
United States Patent and Trademark Office, "Non-Final Office Action," issued in connection with U.S. Appl. No. 13/239,005, on Jun. 4, 2013 (28 pages).
United States Patent and Trademark Office, "Non-Final Office Action," issued in connection with U.S. Appl. No. 13/691,175, on Sep. 9, 2013 (35 pages).
United States Patent and Trademark Office, "Non-Final Office Action," issued in connection with U.S. Appl. No. 13/690,915, on Sep. 5, 2013 (36 pages).
International Searching Authority, "International Preliminary Report on Patentability," issued in connection with application No. PCT/US2012/026760, on Sep. 24, 2013 (4 pages).
IP Australia, "Examination Report No. 2," issued in connection with Australian application No. 2012231667, on Feb. 10, 2015, 3 pages.
Patent Cooperation Treaty, "International Search Report," issued in connection with International application No. PCT/US2014/068165, on Feb. 25, 2015, 3 pages.
Patent Cooperation Treaty, "Written Opinion of the International Searching Authority," issued in connection with International application No. PCT/US2014/068165, on Feb. 25, 2015, 5 pages.

United States Patent and Trademark Office, "Notice of Allowance," issued in connection with U.S. Appl. No. 13/756,493, on Mar. 17, 2015, 15 pages.
Patent Cooperation Treaty, "International Search Report," issued in connection with International application No. PCT/US2014/068168, on Mar. 2, 2015, 3 pages.
Patent Cooperation Treaty, "Written Opinion of the International Searching Authority," issued in connection with International application No. PCT/US2014/068168, on Mar. 2, 2015, 5 pages.
Japanese Patent Office, "Notice of Reasons for Rejection" issued in connection with Japanese application No. P2013-544887, on Aug. 12, 2014, with English translation, 16 pages.
Patent Cooperation Treaty, "International Search Report and Written Opinion of the International Searching Authority," issued in connection with International application No. PCT/US2014/034389, on Sep. 5, 2014, 15 pages.
European Patent Office, "Extended European Search Report," issued in connection with European application No. 12760524.4, on Aug. 18, 2014, 8 pages.
Patent Cooperation Treaty, "International Search Report and Written Opinion," issued in connection with International application No. PCT/US2014/035683, on Sep. 12, 2014, 13 pages.
Patent Cooperation Treaty, "International Search Report and Written Opinion," issued in connection with International application No. PCT/US2014/037064, on Sep. 12, 2014, 9 pages.
United States Patent and Trademark Office, "Non-Final Office Action," issued in connection with U.S. Appl. No. 13/756,493, on Jan. 17, 2014, 33 pages.
United States Patent and Trademark Office, "Notice of Allowance," issued in connection with U.S. Appl. No. 13/756,493, on May 20, 2014, 32 pages.
United States Patent and Trademark Office, "Notice of Allowance," issued in connection with U.S. Appl. No. 13/396,071, on Oct. 24, 2014, 31 pages.
Canadian Intellectual Property Office, "Office Action," issued in connection with Canadian application No. 2,819,268, on Nov. 24, 2014, 4 pages.
United States Patent and Trademark Office, "Non-Final Office Action," issued in connection with U.S. Appl. No. 14/014,050, on Sep. 12, 2014, 32 pages.
Patent Cooperation Treaty, "International Search Report and Written Opinion," issued in connection with International application No. PCT/US2014/050551, on Nov. 24, 2014, 11 pages.
Patent Cooperation Treaty, "International Preliminary Report on Patentability," issued in connection with International application No. PCT/US2013/045211, on Dec. 16, 2014, 8 pages.
IP Australia, "Patent Examination Report No. 1," issued in connection with Australian application No. 2013204865, on Dec. 22, 2014, 3 pages.
United States Patent and Trademark Office, "Non-Final Office Action," issued in connection with U.S. Appl. No. 13/915,381, on Jan. 30, 2015, 52 pages.
Patent Cooperation Treaty, "International Search Report," issued in connection with International application No. PCT/US2014/068621, on Feb. 27, 2015, 3 pages.
Patent Cooperation Treaty, "Written Opinion," issued in connection with International application No. PCT/US2014/068621, on Feb. 27, 2015, 7 pages.
Canadian Intellectual Property Office, "Office Action," issued in connection with Canadian application No. 2,810,541, on Jan. 20, 2015, 3 pages.
The State Intellectual Property Office of China, "First Notification of Office Action," issued in connection with Chinese application No. 201180045957.2, on Nov. 15, 2014, with English translation, 20 pages.
Japanese Patent Office, "Final Rejection," issued in connection with Japanese application No. P2014-005867 on Aug. 26, 2014, with English translation, 8 pages.
Japanese Patent Office, "Notice of Reasons for Rejection," issued in connection with Japanese application No. P2014-005867, on Feb. 17, 2015, with English translation, 6 pages.

(56) References Cited

OTHER PUBLICATIONS

Japanese Patent Office, "Notice of Reasons for Rejection," issued in connection with Japanese application No. P2014-005867, on Apr. 15, 2014, with English translation, 10 pages.
United States Patent and Trademark Office, "Non-Final Office Action," issued in connection with U.S. Appl. No. 14/500,297, on Jan. 5, 2015, 7 pages.
IP Australia, "Patent Examination Report No. 1," issued in connection with Australian application No. 2013203898, on Nov. 27, 2014, 4 pages.
IP Australia, "Patent Examination Report No. 1," issued in connection with Australian application No. 2011305429, on Apr. 17, 2014, 4 pages.
The State Intellectual Property Office of China, "First Notification of Office Action," issued in connection with Chinese application No. 201180061437.0, on Mar. 7, 2014, with English translation, 11 pages.
The State Intellectual Property Office of China, "Second Notification of Office Action," issued in connection with Chinese application No. 201180061437.0, on Nov. 15, 2014, with English translation, 6 pages.
IP Australia, "Patent Examination Report No. 1," issued in connection with Australian application No. 2011374955, on Sep. 25, 2014, 3 pages.
Canadian Intellectual Property Office, "Office Action," issued in connection with Canadian application No. 2,873,128, on Jan. 7, 2015, 3 pages.
United States Patent and Trademark Office, "Non-Final Office Action," issued in connection with U.S. Appl. No. 13/756,493, on Nov. 19, 2014, 13 pages.
Canadian Intellectual Property Office, "Office Action," issued in connection with Canadian application No. 2,810,264, on Nov. 27, 2014, 5 pages.
Australian Government, IP Australia, "Notice of Acceptance," issued in connection with Application No. 2011305429, Jul. 15, 2015, 2 pages.
United States Patent and Trademark Office, "Final Office Action," issued in connection with U.S. Appl. No. 14/025,575, Aug. 17, 2015, 78 pages.
United States Patent and Trademark Office, "Non-Final Office Action," issued in connection with U.S. Appl. No. 14/025,567, Aug. 6, 2015, 59 pages.
Japanese Patent Office, "Notice of Reasons for Rejection," issued in connection with Japanese Patent Application No. P2015-078539 on Jul. 14, 2015 (6 pages).
IP Australia, "Patent Examination Report No. 1," issued in connection with Australian Patent Application No. 2013204354, mailed Nov. 17, 2014 3 pages.
Canadian Intellectual Property Office, "Office Action," issued in connection with application No. 2,810,264 on Mar. 15, 2016, 5 pages.
IP Australia, "Notice of Acceptance," issued in connection with application No. 2015200121 on Apr. 18, 2016, 2 pages.
IP Australia, "Patent Examination Report No. 1" issued in connection with application No. 2015200121 on Nov. 30, 2015, 2 pages.
The State Intellectual Property Office of China, "2nd Office Action," issued in connection with application No. 201280003504.8, on Nov. 30, 2015, 9 pages.
Patent Cooperation Treaty, "Written Opinion of the International Searching Authority," issued by the International Searching Authority in connection with PCT Application No. PCT/US2014/036298 on Aug. 12, 2015, 6 pages.

Patent Cooperation Treaty, "International Search Report," issued by the International Searching Authority in connection with PCT Application No. PCT/US2014/036298, on Aug. 12, 2015, 3 pages.
IP Australia, "Notice of Grant" issued in connection with Application No. 2011374955, on Dec. 17, 2015, 1 page.
The State Intellectual Property Office of China, "1st Office Action," issued in connection with Application No. 201310338209.4 on Dec. 22, 2015, 16 pages.
State Intellectual Property Office of China, "Notice of Allowance," issued in connection with Application No. 201180045957.2, Feb. 5, 2016, 5 pages.
Canadian Intellectual Property Office, "Office Action," issued in connection with Canadian Patent Application No. 2,875,434, on Dec. 4, 2015, 4 pages.
Canadian Intellectual Property Office, "Office Action," issued in connection with Canadian Patent Application No. 2,875,437, on Dec. 4, 2015, 5 pages.
IP Australia, "Notice of Acceptance" issued in connection with Application No. 2014262739, Oct. 30, 2015, 2 pages.
European Patent Office, "Extended European Search Report," issued in connection with Application No. 13803850.0, Dec. 9, 2015, 8 pages.
International Searching Authority, "International Search Report," issued in connection with International Patent Application No. PCT/US2015/040943, mailed Oct. 28, 2015, 3 pages.
International Searching Authority, "Written Opinion," issued in connection with International Patent Application No. PCT/US2015/040943, mailed Oct. 28, 2015, 7 pages.
Japanese Patent Office, "Notice of Reasons for Rejection," issued in connection with Application No. P2015-516283, Jan. 19, 2016, 8 pages.
Canadian Intellectual Property Office, "Office Action," issued in connection with Application No. 2,875,210, Jan. 15, 2016, 4 pages.
Korean Intellectual Property Office, "Notice of Preliminary Rejection," issued in connection with Korean Application No. 10-2014-7034081, Nov. 13, 2015, 13 pages.
Taboga, Marco. (2010) "Linear combinations of normal random variables", from "Lectures on probability and statistics," <http://www.statlect.com/normal_distribution_linear_combinations.htm>, retrieved on Nov. 23, 1015, 4 pages.
Jennings, et al. "Adding adaptive models makes neural net fraud models more robust." FICO Blog, Sep. 7, 2011, 4 pages.
Japanese Patent Office, "Notice of Reasons for Rejection," issued in connection with Japanese Patent Application No. P2015-0524512 on Jun. 30, 2015 (7 pages).
State Intellectual Property Office of China, "Second Office Action," issued in connection with Chinese Patent Application No. 201180045957.2, on Jul. 29, 2015 (5 pages).
Australian Government, IP Australia, "Patent Examination Report No. 1," issued in connection with Australian Application No. 2013204953, Dec. 23, 2014 (5 pages).
United States Patent and Trademark Office, "Notice of Allowance," issued in connection with U.S. Appl. No. 14/641,982, Sep. 2, 2015 (13 pages).
United States Patent and Trademark Office, "Supplemental Notice of Allowance," issued in connection with U.S. Appl. No. 14/641,982, Sep. 23, 2015 (2 pages).
United States Patent and Trademark Office, "Final Office Action," issued in connection with U.S. Appl. No. 13/963,737, Sep. 21, 2015, 26 pages.

\* cited by examiner

236 →

| AME USER ID 502 | PARTNER USER ID 504 | LOGIN TIMESTAMP 506 |
|---|---|---|
| 123 | TOM | 01-01-2010 12:57 AM |
| 123 | MARY | 01-01-2010 3:00 PM |
| 123 | TOM | 01-01-2010 6:00 PM |
| 456 | TOM | 01-01-2010 8:00 PM |

PARTNER COOKIE MAP

| AME USER ID 602 | TIMESTAMP 604 | CAMPAIGN ID 606 | SITE ID 608 |
|---|---|---|---|
| 123 | 01-01-2010 1:57 AM | A0893B | 325 |
| 123 | 01-01-2010 2:00 AM | A0983D | 458 |
| 123 | 01-01-2010 4:00 AM | A0453A | 325 |
| 123 | 01-01-2010 3:30 PM | A0294C | 458 |
| 123 | 01-01-2010 4:30 PM | A0132B | 325 |
| 123 | 01-01-2010 5:30 PM | A0893B | 458 |
| 123 | 01-01-2010 6:30 PM | A0322D | 687 |
| 456 | 01-01-2010 9:30 PM | A0983D | 687 |
| 456 | 01-01-2010 10:30 PM | A0322D | 458 |

AME IMPRESSION STORE

FIG. 6

PARTNER-BASED IMPRESSIONS

| FREQUENCY | UUIDs (COOKIES) | IMPRESSION |
|---|---|---|
| 1 | 100,000 | 100,000 |
| 2 | 200,000 | 400,000 |
| 3 | 100,000 | 300,000 |
| 4 | 50,000 | 200,000 |
| 5 | 50,000 | 1,500,000 |
| TOTAL | 500,000 | 2,500,000 |

IMPRESSIONS TOTALIZATION

FIG. 8

| AGE/GENDER | IMPRESSIONS | FREQUENCY | IMPRESSION COMP |
|---|---|---|---|
| M 13-18 | 1,000,000 | 4 | 33% |
| F 13-18 | 2,000,000 | 5 | 66% |
| ... | | | |
| F 50+ | 0 | 0 | 0 |
| TOTAL | 3,000,000 | 4.7 | 100% |

CAMPAIGN-LEVEL AGE/GENDER AND
IMPRESSION COMPOSITION TABLE

FIG. 9

| meter_id | member_id | computer_id | start_time | end_time |
|---|---|---|---|---|
| 20144152076 | 1 | 856470 | Sept. 14 12:02:33 | Sept. 14 12:31:34 |
| 20144152076 | 2 | 856470 | Sept. 14 13:10:14 | Sept. 14 13:18:02 |
| 20144152076 | 2 | 856470 | Sept. 15 08:05:15 | Sept. 15 09:10:10 |
| 20144152076 | 1 | 856470 | Sept. 15 17:15:09 | Sept. 15 18:15:12 |

FIG. 17

| cookie_value | meter_id | computer_id | local_time |
|---|---|---|---|
| 100000964240495 | 1 | 856470 | Sept. 14 12:12:33 |
| 100000964240495 | 2 | 856470 | Sept. 14 08:15:15 |
| 100000964240495 | 2 | 856470 | Sept. 15 17:15:02 |

FIG. 18

| cookie_value | meter_id | member_id | Count of Session with log-in from cookie |
|---|---|---|---|
| 100000964240495 | 20144152076 | 1 | 2 |
| 100000964240495 | 20144152076 | 2 | 1 |

FIG. 19

| cookie_value | meter_id | member_id |
|---|---|---|
| 100000964240495 | 20144152076 | 1 |

FIG. 20

| cookie_value | meter_id | member_id |
|---|---|---|
| 100000964240495 | 20144152076 | 1 |
| 643906871 | 20144152076 | 2 |

FIG. 21

| cookie_value | meter_id | computer_id | local_time |
|---|---|---|---|
| 100000964240495 | 20144152076 | 856470 | Oct. 02 10:05:00 |
| 643906871 | 20144152076 | 856470 | Oct. 3 12:35:00 |
| 100000964240495 | 20144152076 | 856470 | Oct. 3 18:22:00 |

FIG. 22

| computer_id | meter_id | member_id | session_start | session_end |
|---|---|---|---|---|
| 856470 | 20144152076 | 1 | Oct. 02 10:05:00 | Oct. 3 12:34:59 |
| 856470 | 20144152076 | 2 | Oct. 3 12:35:00 | Oct. 3 18:21:59 |
| 856470 | 20144152076 | 1 | Oct. 3 18:22:00 | |

FIG. 23

| DEMO GROUP | Pageviews Count (using demo group of the prompted panelist) 2404 | Pageviews Count (using the demo group of the partner information) 2402 | Pageviews Adjustment Factor 2406 |
|---|---|---|---|
| Male 2 yrs - 11 yrs | 838 | 203 | 24% |
| Male 12 yrs - 18 yrs | 1,643 | 1,908 | 116% |
| Male 19 yrs - 25 yrs | 1,381 | 1,453 | 105% |
| Male 26 yrs - 35 yrs | 2,901 | 1,641 | 57% |
| Male 36 yrs - 54 yrs | 6,308 | 4,107 | 65% |
| Male 55 yrs + | 4,132 | 1,534 | 37% |
| Female 2 yrs - 11 yrs | 910 | 379 | 42% |
| Female 12 yrs - 18 yrs | 1,801 | 2,137 | 119% |
| Female 19 yrs - 25 yrs | 1,687 | 2,017 | 120% |
| Female 26 yrs - 35 yrs | 4,818 | 5,444 | 113% |
| Female 36 yrs - 54 yrs | 8,849 | 6,647 | 75% |
| Female 55 yrs + | 5,675 | 2,663 | 47% |
| ALL | 40,943 | 30,133 | 74% |

FIG. 24

| DEMO GROUP | Avg Weekly Unique Panelist Count (using demo group of the prompted panelist) | Avg Weekly Unique Panelist Count (using demo group of the partner information) | Unique Audience Adjustment Factor |
|---|---|---|---|
| Male 2 yrs - 11 yrs | 33 | 15 | 44% |
| Male 12 yrs - 18 yrs | 114 | 109 | 95% |
| Male 19 yrs - 25 yrs | 104 | 92 | 88% |
| Male 26 yrs - 35 yrs | 185 | 100 | 54% |
| Male 36 yrs - 54 yrs | 364 | 192 | 53% |
| Male 55 yrs + | 208 | 68 | 33% |
| Female 2 yrs - 11 yrs | 50 | 25 | 50% |
| Female 12 yrs - 18 yrs | 134 | 150 | 112% |
| Female 19 yrs - 25 yrs | 119 | 127 | 107% |
| Female 26 yrs - 35 yrs | 266 | 262 | 98% |
| Female 36 yrs - 54 yrs | 507 | 365 | 72% |
| Female 55 yrs + | 305 | 142 | 47% |
| ALL | 2,389 | 1,646 | 69% |

FIG. 25

METHODS AND APPARATUS TO DETERMINE AN ADJUSTMENT FACTOR FOR MEDIA IMPRESSIONS

RELATED APPLICATION

This patent is a continuation of U.S. patent application Ser. No. 13/756,493, entitled "METHODS AND APPARATUS TO DETERMINE AN ADJUSTMENT FACTOR FOR MEDIA IMPRESSIONS," filed on Jan. 31, 2013, which is a continuation of PCT International Application Serial No. PCT/US12/26760, entitled "METHODS AND APPARATUS TO DETERMINE MEDIA IMPRESSIONS," filed Feb. 27, 2012, which claims priority to U.S. Provisional Patent Application Ser. No. 61/454,326, filed on Mar. 18, 2011. U.S. patent application Ser. No. 13/756,493, PCT International Application Serial No. PCT/US12/26760, and U.S. Provisional Patent Application Ser. No. 61/454,326 are incorporated herein by reference in their entirety.

FIELD OF THE DISCLOSURE

The present disclosure relates generally to monitoring media and, more particularly, to methods and apparatus to determine media impressions.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media (e.g., television programs or radio programs, movies, DVDs, advertisements, etc.) exposed to those panel members. In this manner, the audience measurement entity can determine exposure measures for different media based on the collected media measurement data.

Techniques for monitoring user access to Internet resources such as web pages, advertisements and/or other content has evolved significantly over the years. Some known systems perform such monitoring primarily through server logs. In particular, entities serving media on the Internet can use known techniques to log the number of requests received for their media at their server.

BRIEF DESCRIPTION OF THE DRAWINGS

FIG. 5 is an example partner cookie map that may be used by an Internet service database proprietor to map user identifiers associated with an audience measurement entity with user identifiers of users registered with the Internet service database proprietor.

FIG. 6 is an example impressions table generated by the impression monitor system of the example system of FIG. 1 to correlate impressions with user identifiers of monitored audience members.

FIG. 8 depicts an example impressions table showing quantities of impressions associated with monitored users.

FIG. 9 depicts an example campaign-level age/gender and impression composition table generated by a database proprietor.

FIGS. 17 to 25 illustrate example tables that may be generated by the system of FIG. 16.

DETAILED DESCRIPTION

Figure 1:
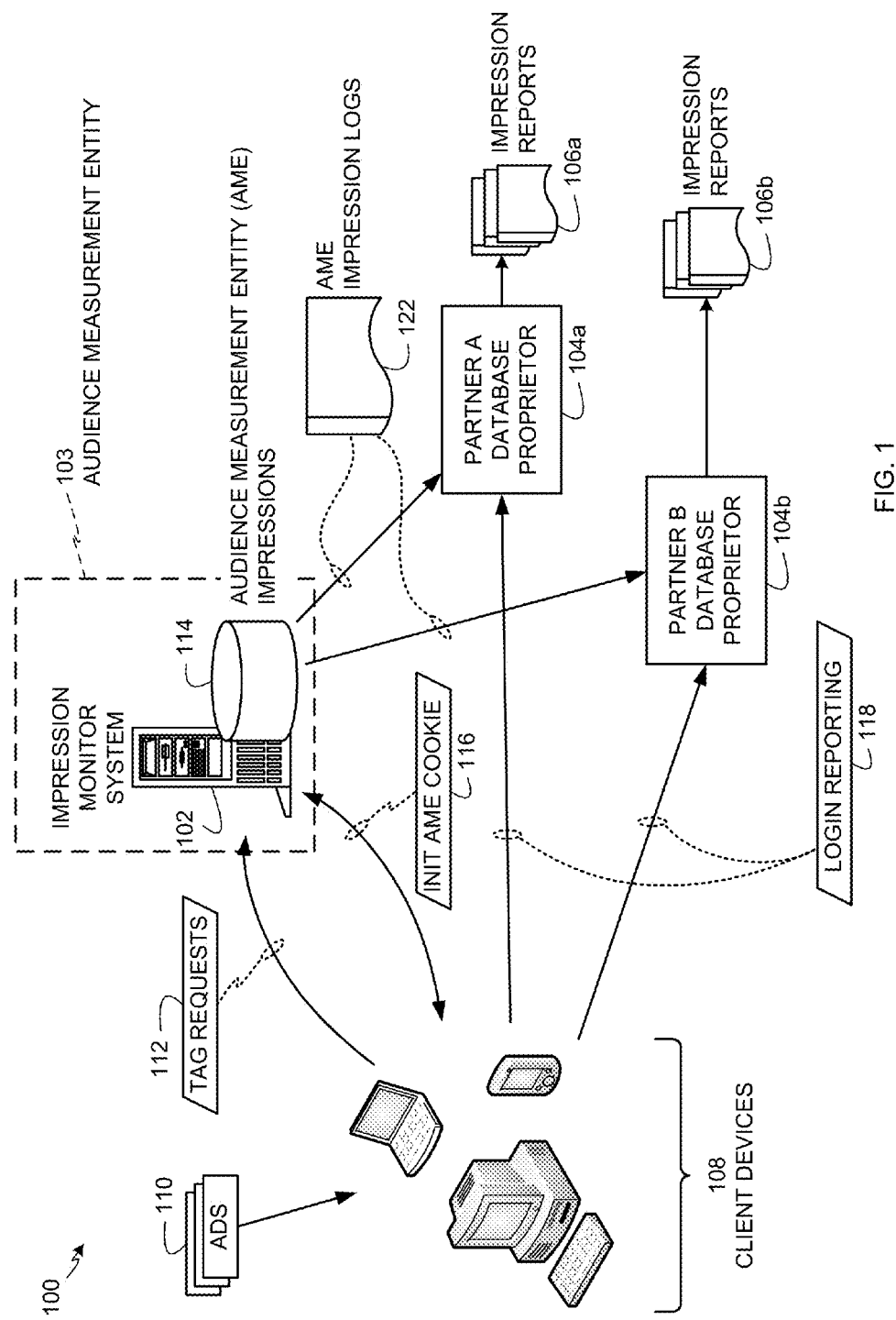
FIG. 1 depicts an example system to determine advertisement and/or media impressions using distributed demographic information.

Techniques for monitoring user access to Internet resources such as web pages, advertisements, content and/or other media has evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs that repeatedly request media from the server to increase the server log counts. Secondly, media is sometimes retrieved once, cached locally and then repeatedly viewed from the local cache without involving the server in the repeat viewings. Server logs cannot track these views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media (e.g., content, advertisements, etc.) to be tracked is tagged with beacon instructions (e.g., tag instructions). In particular, monitoring instructions are associated with the HTML of the media (e.g., advertisements or other Internet content) to be tracked. When a client requests the media, both the content and the beacon or tag instructions are downloaded to the client either simultaneously (e.g., with the tag instructions present in the HTML) or via subsequent requests (e.g., via execution of a request to retrieve the monitoring instructions embedded in the HTML of the content). The tag instructions are, thus, executed whenever the media is accessed, be it from a server or from a cache.

The tag instructions cause monitoring data reflecting information about the access to the media to be sent from the client that downloaded the media to a monitoring entity. The monitoring entity may be an audience measurement entity that did not provide the media to the client and who is a trusted third party for providing accurate usage statistics (e.g., The Nielsen Company, LLC). Advantageously, because the tag instructions are associated with the media (e.g., embedded in or otherwise linked to some portion of the media) and executed by the client browser whenever the media is accessed, the monitoring information is provided to the audience measurement company irrespective of whether the client is a panelist of the audience measurement company.

In some instances, it is important to link demographics to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie (e.g., a panelist cookie) on the panelist computer that enables the audience measurement entity to identify the panelist whenever the panelist accesses tagged media (e.g., media associated with beacon or tag instructions) and, thus, sends monitoring information to the audience measurement entity.

Since most of the clients providing monitoring information from the tagged pages are not panelists and, thus, are unknown to the audience measurement entity, it has heretofore been necessary to use statistical methods to impute demographic information based on the data collected for panelists to the larger population of users providing data for the tagged media. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers or registered users. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computing device (e.g., computer, cell phone, etc.) of their subscribers to enable the database proprietors to recognize the users when they visit their websites.

The protocols of the Internet make cookies inaccessible outside of the domain (e.g., Internet domain, domain name, etc.) on which they were set. Thus, a cookie set in the HFZlaw.com domain is accessible to servers in the HFZlaw.com domain, but not to servers outside that domain. Therefore, although an audience measurement entity might find it advantageous to access the cookies set by the database proprietors, they are unable to do so.

In view of the foregoing, FIGS. 1-15 illustrate and the corresponding portions of the specification describe methods and apparatus to leverage the existing databases of database proprietors to collect more extensive Internet usage and demographic data. For example, some of the example methods and apparatus leverage cookies stored on a user computer that identify a user that has logged into a database provider. However, for a shared computer, the identity of the user logged into the database provider may not match the person that is actually using the computer. Consider a circumstance in which a first user logs into the database provider and the cookie is stored on the computer. Assume the first user stops using the computer but does not log out of the database provider. Further, assume a second user then starts using the computer. If the cookie from the database provider is used to identify the computer user while the second user is using the computer, activity at the computer will wrongly be attributed to the first user. Another problem occurs when no database provider cookie exists on a computer. When no cookie exists on a computer, techniques that leverage the cookie will not be able to associate demographic information with the computer activity.

To compensate for incorrect attribution due to incorrect prediction of a user during computing activity, example methods and apparatus described in conjunction with FIGS. 16-28 determine adjustment factor(s) for data determined using database providers (e.g., information determined as described in conjunction with FIGS. 1-15). Some panelists ("traditional panelists") are willing to provide their demographic information to a measurement entity and/or allow collection of more detailed information about their computer activity. For example, some traditional panelists allow panelist meter software to be installed on their computer to track detailed activity of computer activity. In some examples disclosed herein, an adjustment factor (e.g., an error rate, a correction factor, compensation factor, etc.) is determined by comparing demographic information collected from panelist meter software for computing sessions with demographic information determined using a database provider for the same computing sessions. In other words, demographic information for a computing session is determined using two different techniques (e.g., prompting a user to identify themselves using panelist metering software and determining an identify of the user using a database provider) and the demographic information for the two techniques is compared to determine the adjustment factor. The example adjustment factor can then be applied to other computing sessions (e.g., demographic information for all computing sessions (or a subset) determined using the database provider). In some examples, the comparison and determination of the adjustment factor is determined for all traditional panelists to more accurately determine the adjustment factor. An adjustment factor may be determined for each media provider, for each group of media providers, for the entire universe of media providers, and/or any combination of the foregoing.

Turning to the examples of FIGS. 1-15, example methods, apparatus, systems, and/or articles of manufacture disclosed herein cooperate with one or more database proprietors (also referred to herein as partners). The database proprietors provide Internet services to their registered users (e.g., users of those database proprietors) and store demographic information (e.g., in user account records) for those registered users. As part of this effort, the database proprietor agrees to provide demographic information of its registered users to the audience measurement entity for purposes of measuring demographic-based exposures to media such as content and/or advertisements. To prevent violating privacy agreements with the registered users of the database proprietor, examples disclosed herein employ cookie mapping techniques. That is, the database proprietor can maintain a mapping of its registered user cookies (i.e., partner cookies assigned by the database proprietor to its registered users) to cookies assigned by the audience measurement entity (i.e., audience measurement entity (AME) cookies) to the same registered users. In this manner, the audience measurement entity can log impressions of registered users based on the AME cookies and send full or partial AME cookie-based impression logs to a database proprietor. The database proprietor can, in turn, match its registered users to the AME cookie-based impressions based on its partner-to-AME cookie map. The database proprietor can then use the matches to associate demographic information for the matching registered users with corresponding impression logs. The database proprietor can then remove any identifying data (i.e., partner cookie data) from the demographic-based impression logs and provide the demographic-based impression logs to the audience measurement entity without revealing the identities of the database proprietor's registered users to the audience measurement entity. Thus, example techniques disclosed herein may be implemented without compromising privacies of registered users of database proprietors that partner with an audience measurement entity to track impressions based on audience demographics.

A database proprietor (e.g., Facebook) can access cookies it has set on a client device (e.g., a computer) to thereby identify the client based on the internal records (e.g., user account records) of the database proprietor. Because the identification of client devices is done with reference to enormous databases of registered users far beyond the quantity of persons present in a typical audience measurement panel, this process may be used to develop data that is extremely accurate, reliable, and detailed.

Because the audience measurement entity remains the first leg of the data collection process (i.e., receives tag requests generated by tag instructions from client devices to log impressions), the audience measurement entity is able to obscure the source of the media access being logged as well as the identity of the media (e.g., content, webpages, advertisements, and/or other types of media) itself from the database proprietors (thereby protecting the privacy of the media sources), without compromising the ability of the database proprietors to provide demographic information corresponding to ones of their subscribers for which the audience measurement entity logged impressions.

Example methods, apparatus, and/or articles of manufacture disclosed herein can be used to determine impressions or exposures to webpages, advertisements and/or other types of media using demographic information, which is distributed across different databases (e.g., different website owners, different service providers, etc.) on the Internet. Not only do example methods, apparatus, and articles of manufacture disclosed herein enable more accurate correlation of demographics to media impressions, but they also effectively extend panel sizes and compositions beyond persons participating (and/or willing to participate) in the panel of a ratings entity to persons registered in other Internet databases such as the databases of social media sites such as Facebook, Twitter, Google, etc. This extension effectively leverages the media tagging capabilities of the audience ratings entity and the use of databases of non-ratings entities such as social media and other websites to create an enormous, demographically accurate panel that results in accurate, reliable measurements of exposures to Internet media such as webpages, advertising, content of any type, and/or programming.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between media (e.g., content and/or advertisements) exposure to those panelists and different demographic markets. Unlike traditional techniques in which audience measurement entities rely solely on their own panel member data to collect demographics-based audience measurements, example methods, apparatus, and/or articles of manufacture disclosed herein enable an audience measurement entity to obtain demographic information from other entities that operate based on user registration models. As used herein, a user registration model is a model in which users subscribe to services of those entities by creating user accounts and providing demographic-related information about themselves. Obtaining such demographic information associated with registered users of database proprietors enables an audience measurement entity to extend or supplement its panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel.

Any entity having a database identifying demographics of a set of individuals may cooperate with the audience measurement entity. Such entities are referred to herein as "database proprietors" and include entities such as Facebook, Google, Yahoo!, MSN, Twitter, Apple iTunes, Experian, etc. Such database proprietors may be, for example, online web services providers. For example, a database proprietor may be a social network site (e.g., Facebook, Twitter, MySpace, etc.), a multi-service site (e.g., Yahoo!, Google, Experian, etc.), an online retailer site (e.g., Amazon.com, Buy.com, etc.), and/or any other web services site that maintains user registration records and irrespective of whether the site fits into none, or one or more of the categories noted above.

Example methods, apparatus, and/or articles of manufacture disclosed herein may be implemented by an audience measurement entity, a ratings entity, and/or any other entity interested in measuring or tracking audience exposures to content, advertisements and/or any other type(s) of media.

To increase the likelihood that measured viewership is accurately attributed to the correct demographics, example methods, apparatus, and/or articles of manufacture disclosed herein use demographic information located in the audience measurement entity's records as well as demographic information located at one or more database proprietors (e.g., web service providers) that maintain records or profiles of users having accounts therewith. In this manner, example methods, apparatus, and/or articles of manufacture may be used to supplement demographic information maintained by a ratings entity (e.g., an audience measurement company such as The Nielsen Company of Schaumburg, Ill., United States of America, that collects media exposure measurements and/or demographics) with demographic information from one or more different database proprietors (e.g., web service providers).

The use of demographic information from disparate data sources (e.g., high-quality demographic information from the panels of an audience measurement company and/or registered user data of web service providers) results in, for example, improving the reporting effectiveness of metrics for online and/or offline advertising campaigns. Examples disclosed herein use online registration data to identify demographics of users. Such examples also use server impression counts, tagging (also referred to as beaconing), and/or other techniques to track quantities of advertisement and/or media impressions attributable to those users. Online web service providers such as social networking sites and multi-service providers (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media (e.g., content and/or advertisement). Thus, an impression represents a home or an individual having been exposed to an advertisement and/or content or group of advertisements or content. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

Example impression reports generated using example methods, apparatus, and/or articles of manufacture disclosed herein may be used to report TV GRPs and online GRPs in a side-by-side manner. For instance, advertisers may use impression reports to report quantities of unique people or users that are reached individually and/or collectively by TV and/or online advertisements.

Although examples are disclosed herein in connection with advertisements, advertisement exposures, and/or advertisement impressions, such examples may additionally or alternatively be implemented in connection with other types of media in addition to or instead of advertisements. That is, processes, apparatus, systems, operations, structures, data, and/or information disclosed herein in connection with advertisements may be similarly used and/or implemented for use with other types of media such as content. As used herein, "media" refers to content (e.g., websites, movies, television and/or other programming) and/or advertisements.

Turning now to FIG. 1, an example system 100 is shown. In the illustrated example, the system 100 includes an impression monitor system 102 which may be owned and/or operated by an audience measurement entity 103. In the illustrated examples, the impression monitor system 102 works cooperatively with one or more database proprietors, two of which are shown as a partner A database proprietor 104a and a partner B database proprietor 104b, to generate impression reports 106a and 106b using distributed demographic information collected by the database proprietors 104a and 104b. In the illustrated example, the impression reports 106a and 106b are indicative of demographic segments, populations, or groups that were exposed to identified advertisements or content. "Distributed demographics information" is used herein to refer to demographics information obtained from a database proprietor such as an online web services provider. In the illustrated example, the impression monitor system 102 may be owned and/or operated by an audience measurement entity to collect and log impressions from client devices 108 using, for example, audience measurement entity (AME) cookies set on those client devices 108. In illustrated examples described herein, AME cookies (e.g., an AME cookie 208 of FIG. 2) are set in the client devices 108 in response to contacting the audience measurement entity 103 after executing monitoring or tag instructions regardless of whether all, some, or none of the client devices 108 are associated with audience member panels of the audience measurement entity 103. That is, by setting AME cookies in the client devices 108, the audience measurement entity 103 is able to log ad and/or media impressions regardless of whether the ad and/or media impressions are attributable to panelists or non-panelists. In the illustrated example of FIG. 1, the client devices 108 may be stationary or portable computers, handheld computing devices (e.g., tablets such as iPads®), smart phones, Internet appliances, and/or any other type of device that may be connected to the Internet and capable of presenting media.

In the illustrated example, media providers and/or advertisers distribute advertisements 110 via the Internet to users that access websites and/or online television services (e.g., web-based TV, Internet protocol TV (IPTV), etc.). In the illustrated example, the advertisements 110 may be individual, stand alone ads and/or may be part of one or more ad campaigns. The ads of the illustrated example are encoded with identification codes (i.e., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). The advertisements 110 of the illustrated example are also tagged or encoded to include computer executable monitoring instructions (e.g., Java, java script, or any other computer language or script) that are executed by web browsers that access the advertisements 110 via, for example, the Internet. In the illustrated example of FIG. 1, the advertisements 110 are presented to audience members via the client devices 108. Computer executable monitoring instructions may additionally or alternatively be associated with media to be monitored. Thus, although this disclosure frequently speaks in terms of tracking advertisements, it is not restricted to tracking any particular type of media. On the contrary, it can be used to track media (e.g., content and/or advertisements) of any type or form in a network. Irrespective of the type of media being tracked, execution of the monitoring instructions causes the web browser to send impression request(s) 112 (e.g., referred to herein as tag requests 112) to a specified server (e.g., the audience measurement entity). The tag request(s) 112 may be implemented using HTTP requests. However, whereas HTTP requests traditionally identify web pages or other resources to be downloaded, the tag request(s) 112 of the illustrated example include audience measurement information (e.g., ad campaign identification, media identifier, content identifier, and/or user identification information) as their payloads. The server (e.g., the impression monitor system 102) to which the tag request(s) 112 are directed is programmed to log the audience measurement data caused by the tag request(s) 112 as impressions (e.g., ad and/or media impressions depending on the nature of the media tagged with the monitoring instructions). To collect and log exposure measurements, the impression monitor system 102 includes an AME impressions store 114. Example impression logging processes are described in detail below in connection with FIG. 3.

In some examples, advertisements tagged with such tag instructions are distributed with Internet-based media such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.) Example techniques that may be used to implement such monitoring, tag and/or beacon instructions are described in Blumenau, U.S. Pat. No. 6,108,637, which is hereby incorporated herein by reference in its entirety.

In the illustrated example of FIG. 1, the impression monitor system 102 tracks users associated with impressions using AME cookies (e.g., name-value pairs of Universally Unique Identifiers (UUIDs)) when the client devices 108 present tagged advertisements (e.g., the advertisements 110) and/or other tagged media. Due to Internet security protocols, the impression monitor system 102 can only collect cookies set in its domain (e.g., AME cookies). Thus, if, for example, the impression monitor system 102 operates in the "Nielsen.com" domain, it can only collect cookies set in the Nielsen.com domain. Thus, when the impression monitor system 102 receives tag request(s) 112 from the client devices 108, the impression monitor system 102 only has access to AME cookies set on that client device for, for example, the Nielsen.com domain, but not cookies set outside its domain (e.g., outside the Nielsen.com domain).

To overcome the domain limitations associated with collecting cookie information, the impression monitoring system 102 monitors impressions of users of the client devices 108 that are registered users of one or both of the partner A and partner B database proprietors 104a and 104b. When a user of one of the client devices 108 logs into a service of one of the database proprietors 104a or 104b, the client device 108 is directed to the impression monitor system 102 to perform an initialization (INIT) AME cookie message exchange 116 with the impression monitor system 102 and sends a login reporting message 118 to the database proprietor providing that service. For example, as described in more detail below in connection with FIG. 2, if a user logs into a service of the partner A database proprietor 104a, the INIT AME cookie message exchange 116 sets an AME cookie in the client device 108 based on the domain of the impression monitor system 102 for the user that logged into the service of the partner A database proprietor 104a. In addition, the login reporting message 118 sent to the partner A database proprietor 104a includes the same AME cookie for the client device 108 and a partner A cookie set by the partner A database proprietor 104a for the same client device 108. In the illustrated example, the partner A database proprietor 104a sets the partner A cookie in the client device 108 when the client device 108 visits a webpage of the partner A database proprietor 104a and/or when a user logs into a service of the partner A database proprietor 104a via a login page of the partner A database proprietor 104a (e.g., the login webpage 204 of FIG. 2). In the illustrated example, the AME cookie is outside a domain (e.g., a root domain) of the partner A cookie. Because the login reporting message 118 includes the AME cookie, it enables the partner A database proprietor 104a to map its partner A cookie to the AME cookie for the user of the client device 108. The INIT AME cookie message exchange 116 includes a login timestamp indicative of when a user associated with the specified AME cookie logged into the partner A database proprietor 104a. If an AME cookie was previously set for the client, a new AME cookie is not set unless the previous AME cookie has been removed from the client, is no longer present on the client, and/or has expired. These processes are described in greater detail below in connection with FIG. 2.

Subsequently, the impression monitor system 102 receives the tag request(s) 112 based on ads and/or content presented via the client devices 108 and logs impressions based on the presented ads and/or content in association with respective AME cookies of the client devices 108 as described in detail below in connection with FIG. 3. In the illustrated example of FIG. 1, the impression monitor system 102 stores the logged impressions in the AME impressions store 114 and subsequently sends AME impression logs 122 containing some or all of the logged impressions from the AME impressions store 114 to the partner database proprietors 104a and 104b.

Each of the partner database proprietors 104a-b may subsequently use their respective AME cookie-to-partner cookie mappings to match demographics of users of the client devices 108 identified based on partner cookies with impressions logged based on AME cookies in the AME impression logs 122. Example demographic matching and reporting is described in greater detail below in connection with FIG. 4. Because the audience measurement entity 103 sets AME cookies on any client that sends it a tag request (i.e., including non-panelists), the map of the AME cookies to partner cookies is not limited to panelists but instead extends to any client that accesses tagged media. As a result, the audience measurement entity 103 is able to leverage the data of the partner as if the non-panelists with AME cookies were panelists of the audience measurement entity 103, thereby effectively increasing the panel size. In some examples, the panel of the audience measurement entity is eliminated.

Figure 2:
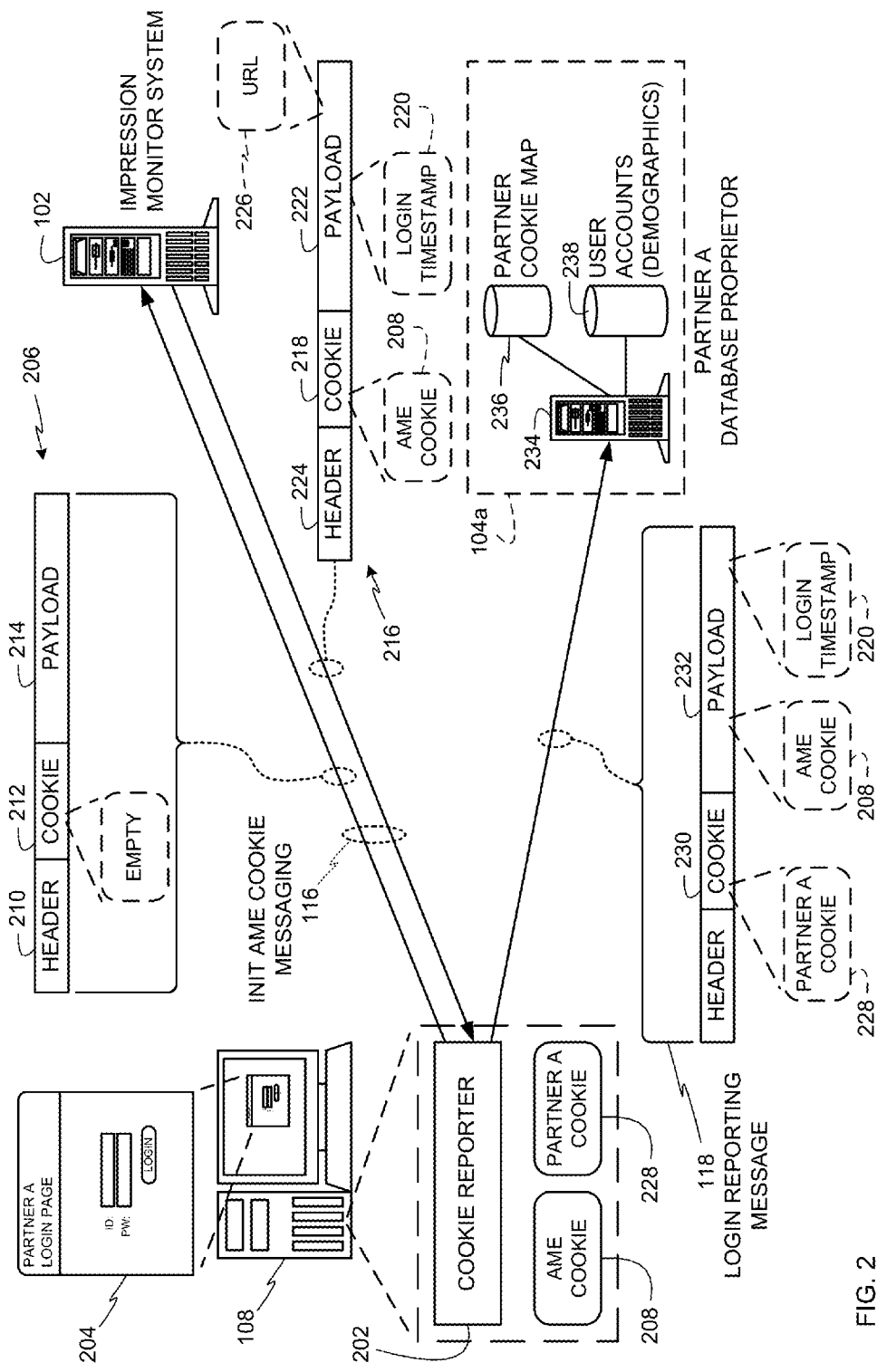
FIG. 2 depicts an example manner of reporting cookies to an audience measurement entity and database proprietor(s) in response to users logging in to website(s) of the database proprietor(s).

FIG. 2 depicts an example manner of setting cookies with the impression monitor system 102 and reporting the same to the database proprietors (e.g., the partner A database proprietor 104a and/or the partner B database proprietor 104b) in response to users logging in to websites of the database proprietors. One of the client devices 108 of FIG. 1 is shown in FIG. 2 and is provided with a cookie reporter 202 configured to monitor login events on the client device 108 and to send cookies to the impression monitor system 102 and the database proprietors 104a and 104b. In the illustrated example of FIG. 2, the cookie reporter 202 is shown performing the INIT AME cookie message exchange 116 with the impression monitor system 102 and sending the login reporting message 118 to the partner A database proprietor 104a.

In the illustrated example of FIG. 2, the cookie reporter 202 is implemented using computer executable instructions (e.g., Java, java script, or any other computer language or script) that are executed by web browsers. Also in the illustrated example of FIG. 2, the cookie reporter 202 is provided to the clients, directly or indirectly, by an audience measurement entity that owns and/or operates the impression monitor system 102. For example, the cookie reporter 202 may be provided to the database proprietor from the AME 103 and subsequently downloaded to the client device 108 from a server serving a login webpage 204 of the partner A database proprietor 104a (or of the partner B database proprietor 104b or of any other partner database proprietor) in response to the client device 108 requesting the login webpage.

A web browser of the client device 108 may execute the cookie reporter 202 to monitor for login events associated with the login page 204. When a user logs in to a service of the partner A database proprietor 104a via the login page 204, the cookie reporter 202 initiates the INIT AME message exchange 116 by sending a request 206 to the impression monitor system 102. In the illustrated example of FIG. 2, the request 206 is a dummy request because its purpose is not to actually retrieve a webpage, but is instead to cause the impression monitor system 102 to generate an AME cookie 208 for the client device 108 (assuming an AME cookie has not already been set for and/or is not present on the client). The AME cookie 208 uniquely identifies the client device 108. However, because the client device 108 may not be associated with a panelist of the AME 103, the identity and/or characteristics of the user may not be known. The impression monitor system 102 subsequently uses the AME cookie 208 to track or log impressions associated with the client device 108, irrespective of whether the client device 108 is a panelist of the AME 103, as described below in connection with FIG. 3. Because disclosed examples monitor clients as panelists even though they may not have been registered (i.e., have not agreed to be a panelist of the AME 103), such clients may be referred to herein as pseudo-panelists.

The request 206 of the illustrated example is implemented using an HTTP request that includes a header field 210, a cookie field 212, and a payload field 214. The header field 210 stores standard protocol information associated with HTTP requests. When the client device 108 does not yet have an AME cookie set therein, the cookie field 212 is empty to indicate to the impression monitor system 102 that it needs to create and set the AME cookie 208 in the client device 108. In response to receiving a request 206 that does not contain an AME cookie 208, the impression monitor system 102 generates an AME cookie 208 and sends the AME cookie 208 to the client device 108 in a cookie field 218 of a response message 216 as part of the INIT AME cookie message exchange 116 of FIG. 1 to thereby set the AME cookie 208 in the client device 108.

In the illustrated example of FIG. 2, the impression monitor system 102 also generates a login timestamp 220 indicative of a time at which a user logged in to the login page 204 and sends the login timestamp 220 to the client device 208 in a payload field 222 of the response 216. In the illustrated example, the login timestamp 220 is generated by the impression monitor system 102 (e.g., rather than the client device 108) so that all login events from all client devices 108 are time stamped based on the same clock (e.g., a clock of the impression monitor system 102). In this manner, login times are not skewed or offset based on clocks of respective client devices 108, which may have differences in time between one another. In some examples, the timestamp 220 may be omitted from the payload 222 of the response 216, and the impression monitor system 102 may instead indicate a login time based on a timestamp in a header field 224 of the response 216. In some examples, the response 216 is an HTTP 302 redirect response which includes a URL 226 of the partner A database proprietor 104a to which the cookie reporter 202 should send the AME cookie 208. The impression monitor system 102 populates the redirect response with the URL.

In the illustrated example of FIG. 2, after receiving the response 216, the cookie reporter 202 generates and sends the login reporting message 118 to the partner A database proprietor 104a. For example, the cookie reporter 202 of the illustrated example sends the login reporting message 118 to a URL indicated by the login page 204. Alternatively, if the response 216 is an HTTP 302 redirect and includes the URL 226, the cookie reporter 202 sends the login reporting message 118 to the partner A database proprietor 104a using the URL 226. In the illustrated example of FIG. 2, the login reporting message 118 includes a partner A cookie 228 in a cookie field 230. The partner A cookie 228 uniquely identifies the client device 108 for the partner A database proprietor 104a. Also in the illustrated example, the cookie reporter 202 sends the AME cookie 208 and the login timestamp 220 in a payload field 232 of the login reporting message 118. Thus, in the illustrated example of FIG. 2, the AME cookie 208 is sent as regular data (e.g., a data parameter) or payload in the login reporting message 118 to the partner A database proprietor 104a to overcome the fact that the AME cookie 208 was not set in the domain of the partner A database proprietor 104a, and, thus, could not be sent to a third party as an ordinary cookie. In the illustrated example, the AME cookie 208 corresponds to another domain (e.g., a Nielsen.com root domain) outside the domain of the partner A cookie 228 (e.g., a Facebook.com root domain). Using example processes illustrated in FIG. 2 advantageously enables sending cookie data across different domains, which would otherwise not be possible using known cookie communication techniques. The database proprietor 104a receives the AME cookie 208 in association with the partner A cookie 228, thereby, creating an entry in an AME cookie-to-partner cookie map (e.g., the partner cookie map 236).

Although the login reporting message 118 is shown in the example of FIG. 2 as including the partner A cookie 228, for instances in which the partner A database proprietor 104a has not yet set the partner A cookie 228 in the client device 108, the cookie field 230 is empty in the login reporting message 118. In this manner, the empty cookie field 230 prompts the partner A database proprietor 104a to set the partner A cookie 228 in the client device 108. In such instances, the partner A database proprietor 104a sends the client device 108 a response message (not shown) including the partner A cookie 228 and records the partner A cookie 228 in association with the AME cookie 208.

In some examples, the partner A database proprietor 104a uses the partner A cookie 228 to track online activity of its registered users. For example, the partner A database proprietor 104a may track user visits to web pages hosted by the partner A database proprietor 104a, display those web pages according to the preferences of the users, etc. The partner A cookie 228 may also be used to collect "domain-specific" user activity. As used herein, "domain-specific" user activity is user Internet activity associated within the domain(s) of a single entity. Domain-specific user activity may also be referred to as "intra-domain activity." In some examples, the partner A database proprietor 104a collects intra-domain activity such as the number of web pages (e.g., web pages of the social network domain such as other social network member pages or other intra-domain pages) visited by each registered user and/or the types of devices such as mobile devices (e.g., smart phones, tablets, etc.) or stationary devices (e.g., desktop computers) used for access. The partner A database proprietor 104a may also track account characteristics such as the quantity of social connections (e.g., friends) maintained by each registered user, the quantity of pictures posted by each registered user, the quantity of messages sent or received by each registered user, and/or any other characteristic of user accounts.

In some examples, the cookie reporter 202 is configured to send the request 206 to the impression monitor system 102 and send the login reporting message 118 to the partner A database proprietor 104a only after the partner A database proprietor 104a has indicated that a user login via the login page 204 was successful. In this manner, the request 206 and the login reporting message 118 are not performed unnecessarily should a login be unsuccessful. In the illustrated example of FIG. 2, a successful login ensures that the partner A database proprietor 104a will associate the correct demographics of a logged in registered user with the partner A cookie 228 and the AME cookie 208.

In the illustrated example of FIG. 2, the partner A database proprietor 104a includes a server 234, a partner cookie map 236, and a user accounts database 238. Although not shown, other database proprietors (e.g., the partner B database proprietor 104b of FIG. 1) that partner with the audience measurement entity 103 (FIG. 1) also include a respective partner cookie map similar to the partner cookie map 236 and a user accounts database similar to the user accounts database 238 but, of course, relative to their own users. The server 234 of the illustrated example communicates with the client device 108 to, for example, receive login information, receive cookies from the client device 108, set cookies in the client device 108, etc.

The partner cookie map 236 stores partner cookies (e.g., the partner A cookie 228) in association with respective AME cookies (e.g., the AME cookie 208) and respective timestamps (e.g., the timestamp 220). In the illustrated example of FIG. 2, the partner cookie map 236 stores a unique user ID (UUID) found in a name-value pair (i.e., a parameter name such as 'user_ID' and a value such as the UUID) of the partner A cookie 228 in association with a unique user ID found in a name-value pair of the AME cookie 208. In addition, the partner cookie map 236 stores the login timestamp 220 in association with the UUIDs to indicate a time at which a corresponding user login occurred. Referring briefly to FIG. 5, an example implementation of the partner cookie map 236 is shown, in which an AME user ID column 502 stores UUIDs from AME cookies (e.g., the AME cookie 208 of FIG. 2), a partner user ID column 504 stores UUIDs from partner cookies (e.g., the partner A cookie 228 of FIG. 2), and a login timestamp column 506 stores login timestamps (e.g., the login timestamp 220 of FIG. 2). In illustrated examples disclosed herein, the partner A database proprietor 104a uses the partner cookie map 236 to match impressions received from the impression monitor system 102 based on AME cookies (e.g., the AME cookie 208) to registered users of the partner A database proprietor 104a identified by respective partner A cookies (e.g., the partner A cookie 228). In this manner, the partner A database proprietor 104a can determine which of its registered users are associated with specific impressions logged by the impression monitor system 102.

Returning to FIG. 2, the partner A database proprietor 104a uses the user accounts database 238 to store, among other things, demographic information for registered users of the partner A database proprietor 104a. In the illustrated example of FIG. 2, such demographic information is received from registered users during an enrollment and/or registration process or during a subsequent personal information update process. The demographic information stored in the user accounts database 238 may include, for example, age, gender, interests (e.g., music interests, movie interests, product interests, or interests associated with any other topic), number of friends or social connections maintained by each registered user via the partner A database proprietor 104a, personal yearly income, household income, geographic location of residence, geographic location of work, graduation year(s), quantity of group associations, or any other demographic information. The partner A database proprietor 104a uses the user accounts database 238 to associate demographic information to particular impressions logged by the impression monitor system 102 after determining which registered users of the partner A database proprietor 104a correspond to which logged impressions based on the partner cookie map 236.

Figure 3:
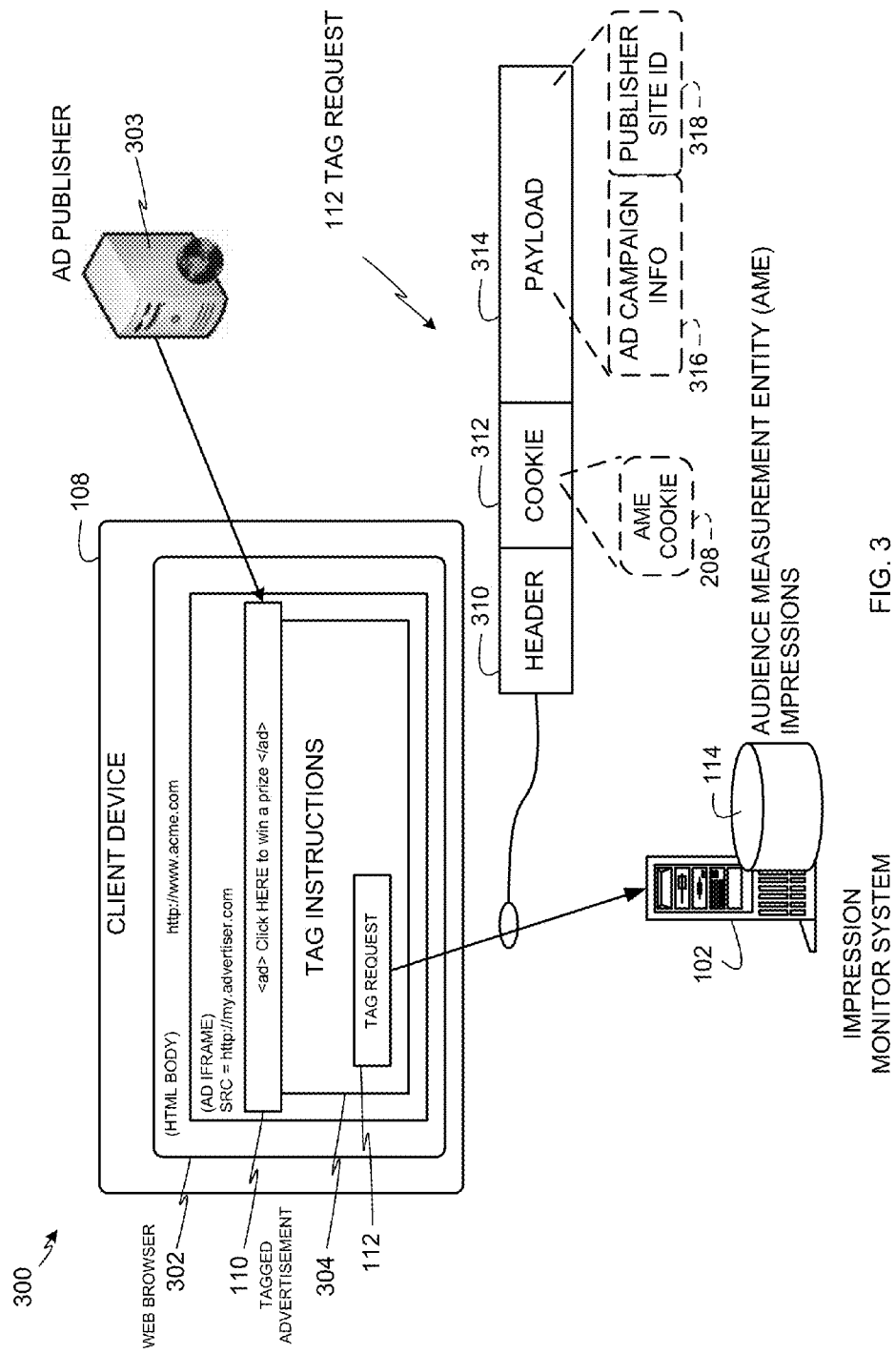
FIG. 3 depicts an example manner in which a web browser can report impressions to an impression monitor of the example system of FIG. 1.

FIG. 3 depicts an example system 300 that may be used to log impressions at the impression monitor system 102 of the example system 100 of FIG. 1. The example system 300 enables the impressions monitor system 102 of FIGS. 1 and 2 to log impressions in association with corresponding AME cookies (e.g., the AME cookie 208 of FIG. 2) based on tag requests (e.g., the tag request(s) 112 of FIG. 1) received from a web browser 302 executed by a client device (e.g., any client device 108 of FIGS. 1 and 2). In the illustrated example of FIG. 3, the impression monitor system 102 logs impressions from any client device (e.g., the client devices 108 of FIG. 1) from which it receives a tag request 112 as described below. The impression monitor system 102 compiles the received impression data in the AME impression data store 114.

Turning in detail to FIG. 3, the client device may be any one of the client devices 108 of FIGS. 1 and 2 or another device not shown in FIG. 1 or 2. However, for simplicity of discussion and without loss of generality, the client device will be referred to as client device 108. As shown, the client device 108 sends communications to the impressions monitor system 102. In the illustrated example, the client device 108 executes the web browser 302, which is directed to a host website (e.g., www.acme.com) that displays one of the advertisement(s) 110 received from an ad publisher 303. The advertisement 110 of the illustrated example is tagged with identifier information (e.g., a campaign ID, a creative type ID, a placement ID, a publisher source URL, etc.) and tag instructions 304. When the tag instructions 304 are executed by the client device 108, the tag instructions 304 cause the client device 108 to send a tag request 112 to a URL address of the impressions monitor system 102 as specified in the tag instructions 304. Alternatively, the URL address specified in the tag instructions 304 may direct the tag request 112 to any other server owned, operated, and/or accessible by the audience measurement entity 103 (FIG. 1) or another entity. The tag instructions 304 may be implemented using java script or any other type(s) of executable instruction(s) including, for example, Java, HTML, etc. It should be noted that tagged content such as web pages, and/or any other media are processed the same way as the tagged advertisement 110. That is, for any tagged media, corresponding tag instructions are received in connection with the download of the tagged content and cause a tag request to be sent from the client device that downloaded the tagged content to the impression monitor system 102 (or any other server indicated by the instructions).

In the illustrated example of FIG. 3, the tag request 112 is implemented using an HTTP request and is shown in detail as including a header field 310, a cookie field 312, and a payload field 314. In the illustrated example of FIG. 3, the web browser 302 stores the AME cookie 208 of FIG. 2 in the cookie field 312 and stores ad campaign information 316 and a publisher site ID 318 in the payload field 314. In the illustrated example, the ad campaign information 316 may include information identifying one or more of an associated ad campaign (e.g., an ad campaign ID), a creative type ID (e.g., identifying a Flash-based ad, a banner ad, a rich type ad, etc.), and/or a placement ID (e.g., identifying the physical placement of the ad on a screen). In some examples, to log a media impression, the ad campaign information 316 is replaced with media information identifying the media (e.g., a media identifier), a creative ID, and/or a placement ID. In the illustrated example, the publisher site ID 318 identifies a source of the advertisement 110 and/or content (e.g., a source ID identifying the ad publisher 303 and/or media publisher).

In the illustrated example, in response to receiving the tag request 112, the impression monitor system 102 logs an impression associated with the client device 108 in the AME impressions store 114 by storing the AME cookie 208 in association with a media identifier (e.g., the ad campaign information 316 and/or the publisher site ID 318). In addition, the impression monitor system 102 generates a timestamp indicative of the time/date of when the impression occurred and stores the timestamp in association with the logged impression. An example implementation of the example AME impression store 114 is shown in FIG. 6. Turning briefly to FIG. 6, the AME impression store 114 includes an AME user ID column 602 to store AME cookies (e.g., the AME cookie 208 of FIGS. 2 and 3), a timestamp column 604 to store impression timestamps indicative of when impressions occurred at client devices (e.g., the client device 108 of FIGS. 1-3), a campaign ID column 606 to store the campaign information 316 of FIG. 3, and a site ID column 608 to store the publisher site ID 318 of FIG. 3.

Figure 4:
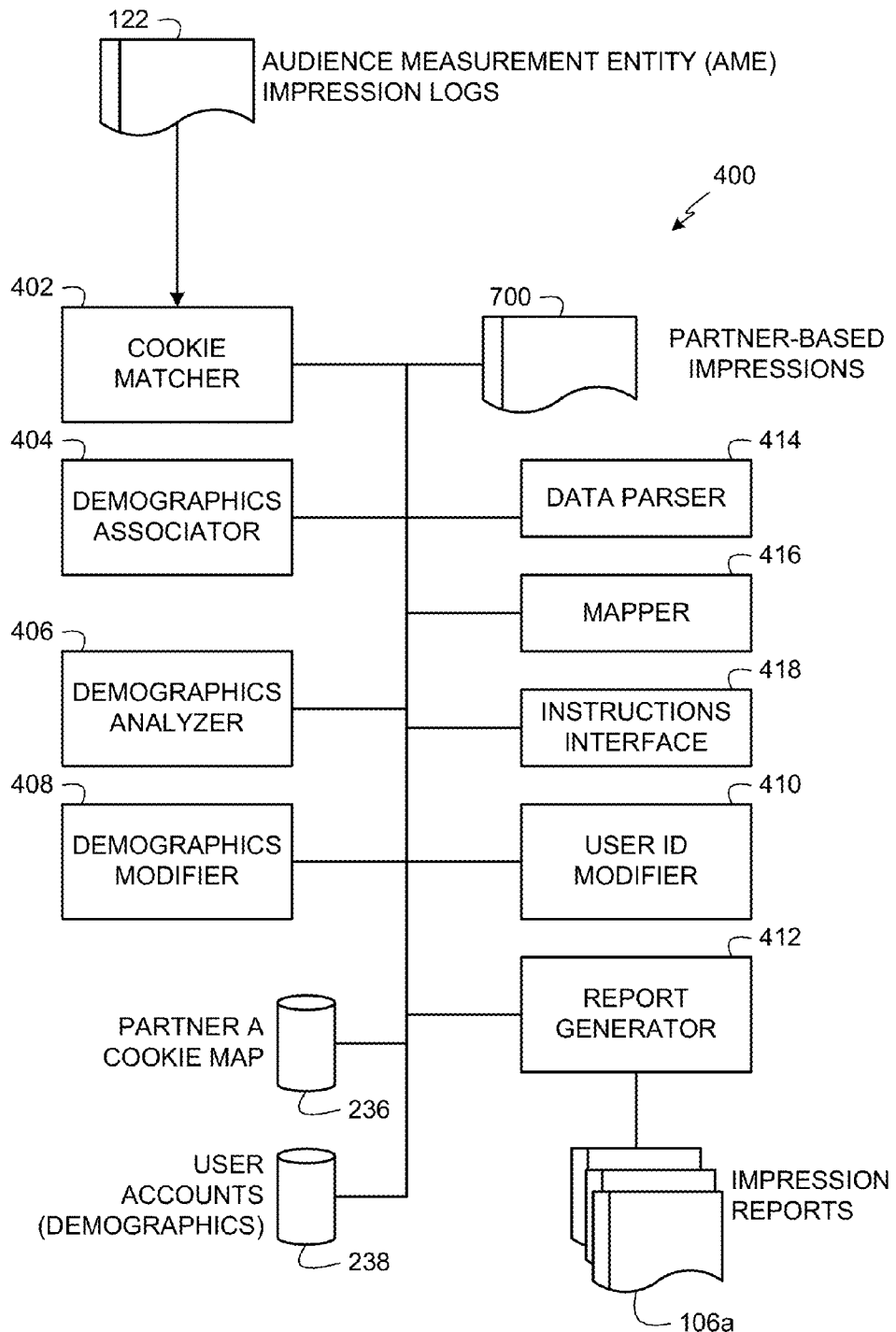
FIG. 4 is an example apparatus that may be used to associate impressions with demographics of users registered with one or more database proprietors.

FIG. 4 is an example apparatus 400 that may be used to associate impressions with demographics of users (e.g., users of the client devices 108 of FIGS. 1-3) registered with one or more database proprietors (e.g., the partner database proprietors 104*a-b* of FIGS. 1-3). In some examples, the apparatus 400 is implemented at one or more database proprietors (e.g., the partner database proprietors 104*a-b* of FIGS. 1-3). Alternatively, the apparatus 400 may be implemented at other sites. In some examples, the apparatus 400 may be developed by the audience measurement entity 103 (FIG. 1) and provided to a database proprietor to enable the database proprietor to combine database proprietor-owned demographic information with impression logs provided by the audience measurement entity 103. To ensure privacy of registered users of a database proprietor, the audience measurement entity 103 may install or locate the example apparatus 400 at a database proprietor so that the database proprietor need not provide identities of its registered users to the audience measurement entity 103 in order to associate demographics information with logged impressions. Instead, the audience measurement entity 103 can provide its logged impressions (e.g., the AME impression logs 122) to the database proprietor and the database proprietor can associate respective demographics with the logged impressions while concealing the identities (e.g., names and contact information) of its registered users.

In the illustrated example, the apparatus 400 is provided with an example cookie matcher 402, an example demographics associator 404, an example demographics analyzer 406, an example demographics modifier 408, an example user ID modifier 410, an example report generator 412, an example data parser 414, an example mapper 416, and an example instructions interface 418. While an example manner of implementing the apparatus 400 has been illustrated in FIG. 4, one or more of the elements, processes and/or devices illustrated in FIG. 4 may be combined, divided, re-arranged, omitted, eliminated and/or implemented in any other way. Further, the cookie matcher 402, the demographics associator 404, the demographics analyzer 406, the demographics modifier 408, the user ID modifier 410, the report generator 412, the data parser 414, the mapper 416, the instructions interface 418 and/or, more generally, the example apparatus 400 of FIG. 4 may be implemented by hardware, software, firmware and/or any combination of hardware, software and/or firmware. Thus, for example, any of the cookie matcher 402, the demographics associator 404, the demographics analyzer 406, the demographics modifier 408, the user ID modifier 410, the report generator 412, the data parser 414, the mapper 416, the instructions interface 418 and/or, more generally, the example apparatus 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the cookie matcher 402, the demographics associator 404, the demographics analyzer 406, the demographics modifier 408, the user ID modifier 410, the report generator 412, the data parser 414, the mapper 416, and/or the instructions interface 418 are hereby expressly defined to include a tangible computer readable medium such as a memory, DVD, CD, BluRay disk, etc. storing the software and/or firmware. Further still, the example apparatus 400 of FIG. 4 may include one or more elements, processes and/or devices in addition to, or instead of, those illustrated in FIG. 4, and/or may include more than one of any or all of the illustrated elements, processes and devices.

Turning in detail to FIG. 4, in the illustrated example, the apparatus 400 is implemented at the partner A database proprietor 104*a* (FIGS. 1 and 2). Other instances of the apparatus 400 could be similarly implemented at any other database proprietor participating with the AME 103 (e.g., the partner B database proprietor 104*b*). In the illustrated example of FIG. 4, the apparatus 400 receives the AME impression logs 122 from the impression monitor system 102 to enable the apparatus 400 to associate user/audience member demographics from the user accounts database 238 with logged impressions.

In the illustrated example, the apparatus 400 is provided with the cookie matcher 402 to match AME user IDs from AME cookies (e.g., the AME cookie 208 of FIGS. 2 and 3) from the AME impression logs 122 to AME user IDs in the partner A cookie map 236. The apparatus 400 performs such cookie matching to identify registered users of the partner A database proprietor 104*a* to which the logged impressions are attributable (e.g., partner A registered users for which the impression monitor system 102 set AME cookies as described above in connection with FIG. 2 and tracked impressions as described above in connection with FIG. 3). For example, the partner cookie map 236 is shown in FIG. 5 as associating AME user IDs in the AME user ID column 502 to partner user IDs in the partner user ID column 504. The AME impression logs 122 are structured similar to the data in the AME impression store 114 as shown in FIG. 6, which logs impressions per AME user ID. Thus, the cookie matcher 402 matches AME user IDs from the AME user ID column 602 of the AME impression logs 122 to AME user IDs of the AME user ID column 502 of the partner cookie map 236 to associate a logged impression from the AME impression logs 122 to a corresponding partner user ID mapped in the partner cookie map 236 of FIG. 5. In some examples, the AME 103 encrypts, obfuscates, varies, etc. campaign IDs in the AME impression logs 122 before sending the AME impression logs 122 to partner database proprietors (e.g., the partner database proprietors 104*a* and 104*b* of FIGS. 1 and 2) to prevent the partner database proprietors from recognizing the media to which the campaign IDs correspond or to otherwise protect the identity of the media. In such examples, a lookup table of campaign ID information may be stored at the impression monitor system 102 so that impression reports (e.g., the impression reports 106a and 106b of FIG. 1) received from the partner database proprietors can be correlated with the media.

In some examples, the cookie matcher 402 uses login timestamps (e.g., the login timestamp 220 of FIG. 2) stored in the login timestamp column 506 of FIG. 5 and impression timestamps stored in the timestamp column 604 of FIG. 6 to discern between different users to which impressions logged by the impression monitor system 102 are attributable. That is, if two users having respective username/password login credentials for the partner A database proprietor 104a use the same client device 108, all impressions logged by the impression monitor system 102 will be based on the same AME cookie (e.g., the AME cookie 208 of FIGS. 2 and 3) set in the client device 108 regardless of which user was using the client device 108 when the impression occurred. However, by comparing logged impression timestamps (e.g., in the timestamp column 604 of FIG. 6) to login timestamps (e.g., in the login timestamp column 506 of FIG. 5), the cookie matcher 402 can determine which user was logged into the partner A database proprietor 104a when a corresponding impression occurred. For example, if a user 'TOM' logged in to the partner A database proprietor 104a at 12:57 AM on Jan. 1, 2010 and a user 'MARY' logged in to the partner A database proprietor 104a at 3:00 PM on Jan. 1, 2010 using the same client device 108, the login events are associated with the same AME cookie (e.g., the AME cookie 208 of FIGS. 2 and 3). In such an example, the cookie matcher 402 associates any impressions logged by the impression monitor system 102 for the same AME cookie between 12:57 AM and 3:00 pm on Jan. 1, 2010 to the user 'TOM' and associates any impressions logged by the impression monitor system 102 for the same AME cookie after 3:00 pm on Jan. 1, 2010 to the user 'MARY'. Such time-based associations are shown in the illustrated example data structure of FIG. 7 described below.

Figure 7:
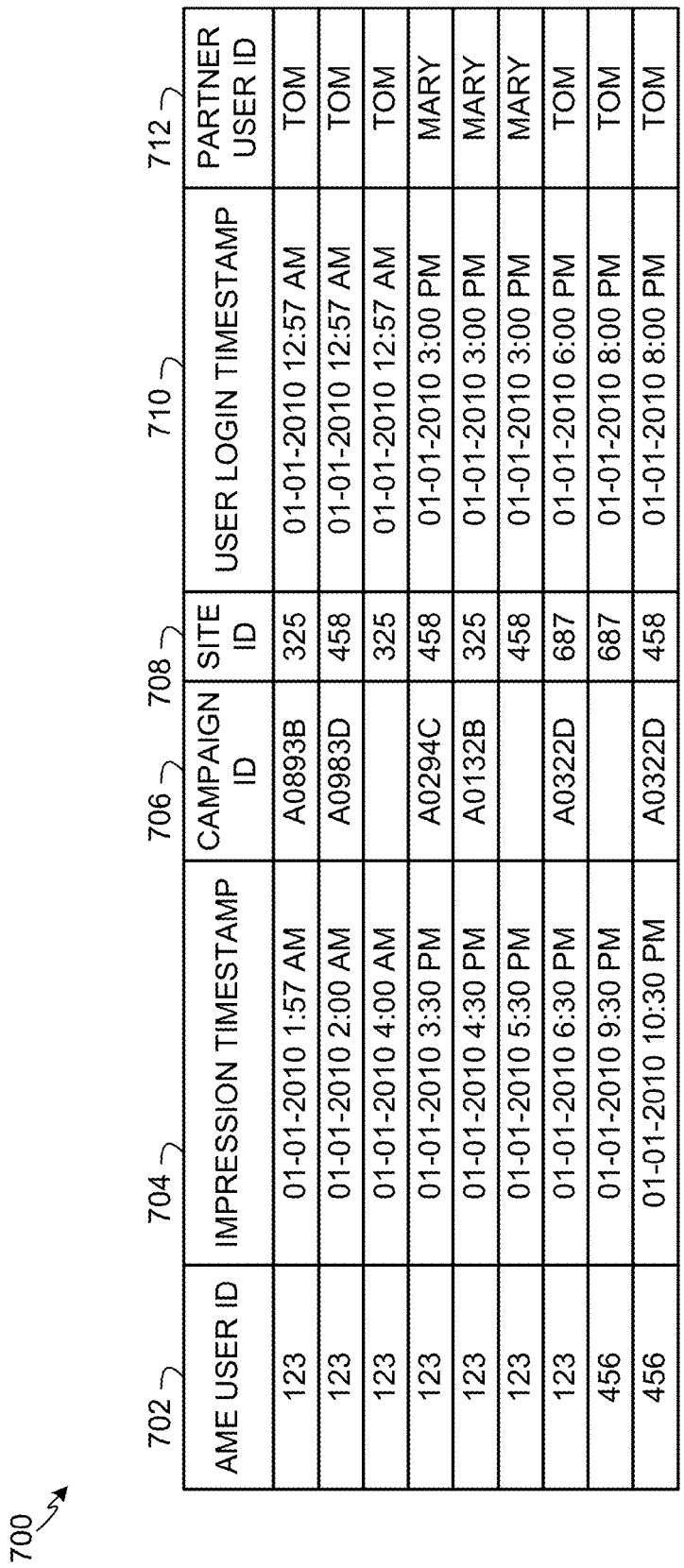
FIG. 7 depicts an example partner-based impressions table generated by an Internet service database proprietor to correlate impressions with user identifiers of registered users of the Internet service database proprietors.

In the illustrated example, the cookie matcher 402 compiles the matched results into an example partner-based impressions data structure 700, which is shown in detail in FIG. 7. Turning briefly to FIG. 7, the partner-based impressions structure 700 includes an AME user ID column 702, an impression timestamp column 704, a campaign ID column 706, a site ID column 708, a user login timestamp 710, and a partner user ID column 712. In the AME user ID column 702, the cookie matcher 402 stores AME cookies (e.g., the AME cookie 208 of FIGS. 2 and 3). In the impression timestamp column 704, the cookie matcher 402 stores timestamps generated by the impression monitor system 102 indicative of when each impression was logged. In the campaign ID column 706, the cookie matcher 402 stores ad campaign IDs stored in, for example, the campaign information 316 of FIG. 3. In some examples, instead of or in addition to the campaign ID column 706, the partner-based impressions data structure 700 includes a content ID column to store identifying information of media. In some examples, some media (e.g., advertisements, content, and/or other media) is not associated with a campaign ID or content ID. In the illustrated example of FIG. 7, blanks in the campaign ID column 706 indicate media that is not associated with campaign IDs and/or content IDs. In the site ID column 708, the cookie matcher 402 stores advertisement publisher site IDs (e.g., the publisher site ID 318 of FIG. 3). In the user login timestamp column 710, the cookie matcher 402 stores timestamps (e.g., the timestamp 220 of FIG. 2) indicative of when respective users logged in via partner login pages (e.g., the login page 204 of FIG. 2). In the partner user ID column 712, the cookie matcher 402 stores partner cookies (e.g., the partner A cookie 228 of FIG. 2).

Returning to FIG. 4, in the illustrated example, the apparatus 400 is provided with the demographics associator 404 to associate demographics information from the user accounts database 238 with corresponding partner-based impressions from the partner-based impressions structure 700. For example, the demographics associator 404 may retrieve demographics information for partner user IDs noted in the partner user ID column 712 (FIG. 7) and associate the retrieved demographics information with corresponding ones of the records in the partner-based impressions structure 700.

In the illustrated example of FIG. 4, to analyze demographic information for accuracy and/or completeness, the apparatus 400 is provided with the demographics analyzer 406. In addition, to update, modify, and/or fill-in demographics information in inaccurate and/or incomplete records, the apparatus 400 is provided with the demographics modifier 408. In some examples, the demographics analyzer 406 and/or the demographics modifier 408 analyze and/or adjust inaccurate demographic information using example methods, systems, apparatus, and/or articles of manufacture disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

In the illustrated example, to remove user IDs from the partner-based impressions structure 700 after adding the demographics information and before providing the data to the AME 103, the apparatus 400 of the illustrated example is provided with a user ID modifier 410. In the illustrated example, the user ID modifier 410 is configured to at least remove partner user IDs (from the partner user ID column 712) to protect the privacy of registered users of the partner A database proprietor 104a. In some examples, the user ID modifier 410 may also remove the AME user IDs (e.g., from the AME user ID column 702) so that the impression reports 106a generated by the apparatus 400 are demographic-level impression reports. "Removal" of user IDs (e.g., by the user ID modifier 410 and/or by the report generator 412) may be done by not providing a copy of the data in the corresponding user ID fields as opposed to deleting any data from those fields. If the AME user IDs are preserved in the impressions data structure 700, the apparatus 400 of the illustrated example can generate user-level impression reports.

In the illustrated example of FIG. 4, to generate the impression reports 106a, the apparatus 400 is provided with the report generator 412. Example information that the report generator 412 may generate for the impression reports 106a is described in detail below in connection with FIGS. 8 and 9.

In the illustrated example of FIG. 4, to parse information, the apparatus 400 is provided with the data parser 414. In some examples, the data parser 414 receives messages from client devices and/or other systems and parses information from those received messages. For example, the apparatus 400 may use the data parser 414 to receive the login reporting message 118 from the cookie reporter 202 (FIG. 2) and parse out the partner A cookie 228, the AME cookie 208, and/or the login timestamp 220 from the login reporting message 118. In some examples, the apparatus 400 also uses the data parser 414 to parse information in the AME impression logs 122 and/or to parse information from any other data structure and/or message.

In the illustrated example of FIG. 4, to map information, the apparatus 400 is provided with the mapper 416. In some examples, the mapper 416 maps cookie identifiers associated with the same user but corresponding to different Internet domains. For example, the apparatus 400 may use the mapper 416 to map the partner A cookie 228 to the AME cookie 208 (FIG. 2) in the partner cookie map 236 (FIGS. 2, 4, and 5). In some examples, the mapper 416 also maps login timestamps with corresponding cookie identifiers. For example, the apparatus 400 may use the mapper 416 to map the login timestamp 220 (FIG. 2) with the corresponding partner A cookie 228 and AME cookie 208 in the partner cookie map 236.

In the illustrated example of FIG. 4, to send computer executable instructions to the client device(s) 108 to monitor user logins via login webpages (e.g., the login webpage 204 of FIG. 2), the apparatus 400 is provided with the instructions interface 418. For example, the apparatus 400 may use the instructions interface 418 to send computer executable instructions (e.g., Java, java script, or any other computer language or script) to the client device 108 that are executed by the web browser 302 (FIG. 3) to implement the cookie reporter 202 (FIG. 2). In some examples, the instructions interface 418 sends the computer executable instructions to the client device 108 in response to receiving a request from the web browser 302 for a login webpage (e.g., the login webpage 204) of an Internet-based service provided by the entity (e.g., one of the database proprietor partners 104a and 104b) that implements the apparatus 400. In this manner, the client device 108 can execute the computer executable instructions to monitor login events at the login webpage.

Figure 15:
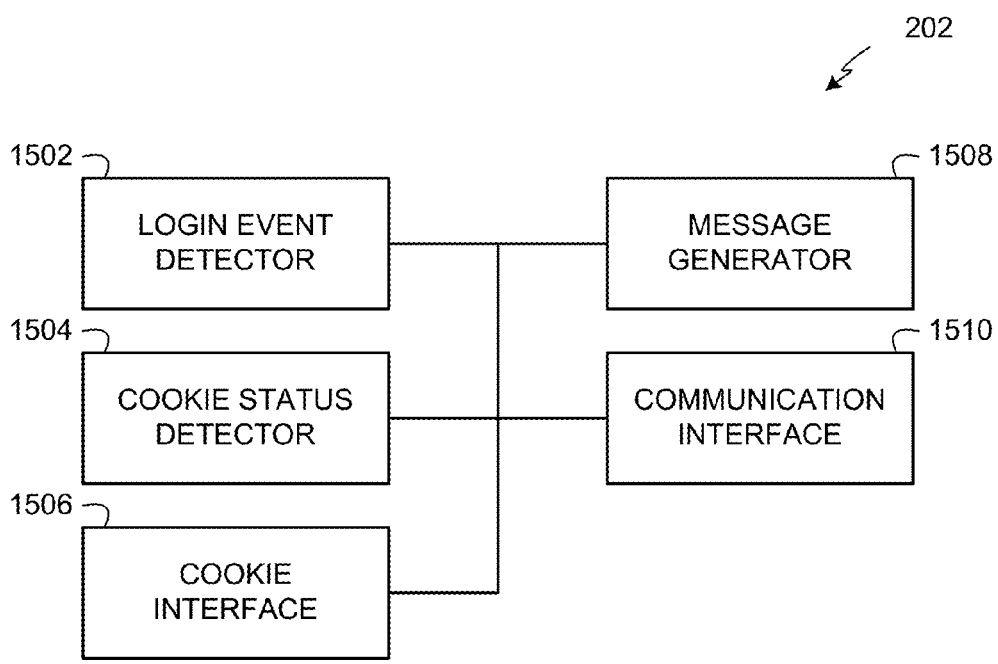
FIG. 15 is an example apparatus that may be used to implement a cookie reporter of FIG. 2.

FIG. 15 is an example apparatus that may be used to implement the impression monitor system 102 of FIGS. 1-3. In the illustrated example, to detect whether AME cookies (e.g., the AME cookie 208 of FIG. 2) have been set (e.g., are stored) in client devices (e.g., any of the client devices 108 of FIGS. 1-3), the impression monitor system 102 is provided with a cookie status detector 1402. For example, the cookie status detector 1402 may inspect or analyze messages (e.g., the request 206 of FIG. 2) from client devices to determine whether AME cookies are present therein. In the illustrated example, to generate AME cookies (e.g., the AME cookie 208 (FIG. 2)), the impression monitor system 102 is provided with a cookie generator 1404.

In the illustrated example, to generate login timestamps (e.g., the login timestamp 220 of FIG. 2), the impression monitor system 102 is provided with a timestamp generator 1406. For example, the timestamp generator 1406 may be implemented using a real-time clock (RTC) or any other timing or clock device or interface to track time and generate timestamps. In the illustrated example, to generate messages (e.g., the response 216 of FIG. 2), the impression monitor system 102 is provided with a message generator 1408. In the illustrated example, to log impressions, the impression monitor system 102 is provided with an impression logger 1410. For example, the impression logger 1410 may log impressions in the AME impression store 114 as shown in FIG. 6.

In the illustrated example, to receive messages and/or information from client devices 108 and send messages and/or information to client devices 108 and/or to partner database proprietors 104a and 104b, the impression monitor system 102 is provided with a communication interface 1412. For example, the communication interface 1412 may receive messages such as the tag request(s) 112 (FIG. 1) and the request 206 (FIG. 2) from client devices 108. Additionally, the communication interface 1412 may send messages such as the response 216 (FIG. 2) to the client devices 108 and send logged impressions (e.g., impressions logged in the AME impression store 114) to partner database proprietors 104a and 104b.

FIG. 15 is an example apparatus that may be used to implement a cookie reporter 202 of FIG. 2. In the illustrated example, to detect log events, the cookie reporter 202 is provided with a login event detector 1502. For example, the login detector 1502 may be configured to monitor login events generated by web browsers (e.g., the web browser 302 of FIG. 3) of client devices (e.g., the client devices 108 of FIGS. 1-3). In the illustrated example, when a user logs in to the login webpage 204 of FIG. 2, the login detector 1502 detects a login event.

In the illustrated example, to detect whether AME cookies (e.g., the AME cookie 208 of FIG. 2) or partner cookies (e.g., the partner cookie 228 of FIG. 2) have been set (e.g., are stored) in client devices (e.g., the client devices 108 of FIGS. 1-3), the cookie reporter 202 is provided with a cookie status detector 1504. For example, the cookie status detector 1502 may inspect or analyze cookie files or cookie entries in client devices to determine whether AME cookies (e.g., the AME cookie 208 of FIG. 2) or partner cookies (e.g., the partner cookie 228 of FIG. 2) have been previously set. In the illustrated example, the cookie status detector 1504 may also determine whether cookies have expired. In the illustrated example, when a cookie expires, it is treated as invalid or as if it no longer exists in a client device and must be set again by a corresponding server domain.

In the illustrated example, to retrieve cookies from storage locations in client devices (e.g., the client devices 108 of FIGS. 1-3), the cookie reporter 202 is provided with a cookie interface 1506. For example, the cookie interface 1506 may retrieve AME cookies (e.g., the AME cookie 208 of FIG. 2) or partner cookies (e.g., the partner cookie 228 of FIG. 2) from their respective storage locations in client devices. In addition, the cookie interface 1506 may also store cookies set by and received from the impression monitor system 102 and/or any partner database proprietor in the client devices.

In the illustrated example, to generate messages (e.g., the tag request(s) 112 of FIGS. 1 and 3, the log reporting messages 118 of FIGS. 1 and 2, and the request 206 of FIG. 2), the cookie reporter 202 is provided with a message generator 1508. In the illustrated example, to send messages and/or information to the impression monitor system 102 and/or to partner database proprietors (e.g., the partner database proprietors 104a and 104b of FIGS. 1 and 2) and/or to receive messages and/or information from the impression monitor system 102, the cookie reporter 202 is provided with a communication interface 1510. For example, the communication interface 1510 may send the tag request(s) 112 (FIGS. 1 and 3) and the request 206 of FIG. 2 to the impression monitor system 102, receive the response 216 (FIG. 2) from the impression monitor system 102, and send the login reporting messages 118 (FIGS. 1 and 2) to the partner database proprietors 104a and 104b.

Figure 14:
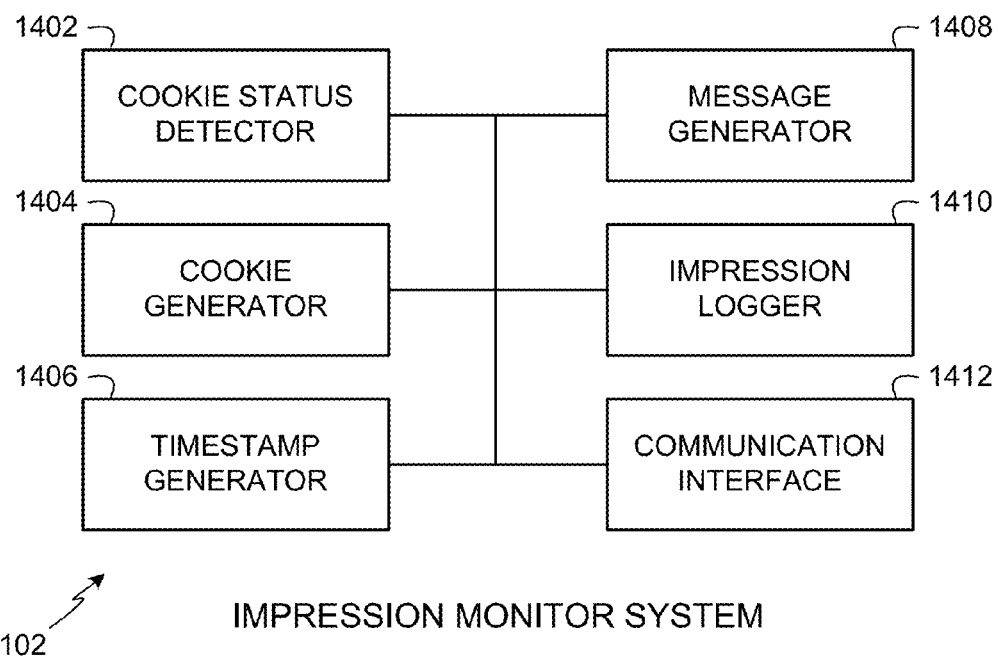
FIG. 14 is an example apparatus that may be used to implement the impression monitor of FIGS. 1-3.

While example manners of implementing the apparatus 102 and 202 have been illustrated in FIGS. 14 and 15, one or more of the elements, processes and/or devices illustrated in FIGS. 14 and 15 may be combined, divided, re-arranged, omitted, eliminated and/or implemented in any other way. Further, the cookie status detector 1402, the cookie generator 1404, the timestamp generator 1406, the message generator 1408, the impression logger 1410, the communication interface 1412 and/or, more generally, the example apparatus 102 of FIG. 14 may be implemented by hardware, software, firmware and/or any combination of hardware, software and/or firmware. In addition, the login event detector 1502, the cookie status detector 1504, the cookie interface 1506, the message generator 1508, the communication interface 1510 and/or, more generally, the example apparatus 202 of FIG. 15 may be implemented by hardware, software, firmware and/or any combination of hardware, software and/or firmware. Thus, for example, any of the cookie status detector 1402, the cookie generator 1404, the timestamp generator 1406, the message generator 1408, the impression logger 1410, the communication interface 1412 and/or, more generally, the example apparatus 102 and/or any of the login event detector 1502, the cookie status detector 1504, the cookie interface 1506, the message generator 1508, the communication interface 1510 and/or, more generally, the example apparatus 202 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the cookie status detector 1402, the cookie generator 1404, the timestamp generator 1406, the message generator 1408, the impression logger 1410, the communication interface 1412, the login event detector 1502, the cookie status detector 1504, the cookie interface 1506, the message generator 1508, and/or the communication interface 1510 are hereby expressly defined to include a tangible computer readable medium such as a memory, DVD, CD, BluRay disk, etc. storing the software and/or firmware. Further still, the example apparatus 102 and 202 may include one or more elements, processes and/or devices in addition to, or instead of, those illustrated in FIGS. 14 and 15, and/or may include more than one of any or all of the illustrated elements, processes and devices.

Turning to FIG. 8, an example impressions totalization data structure 800, which may be generated by the report generator 412 of FIG. 4, stores impression totalizations based on the impressions logged by the impression monitor system 102 (FIGS. 1-3). As shown in FIG. 8, the impressions totalization structure 800 shows quantities of impressions logged for the client devices 108 (FIGS. 1-3). In the illustrated example, the impressions totalization structure 800 is generated by the report generator 412 for an advertisement campaign (e.g., one or more of the advertisements 110 of FIG. 1) to determine frequencies of impressions per day for each monitored user.

To track frequencies of impressions per unique user per day, the impressions totalization structure 800 is provided with a frequency column 802. A frequency of 1 indicates one exposure per day of an ad campaign to a unique user, while a frequency of 4 indicates four exposures per day of the same ad campaign to a unique user. To track the quantity of unique users to which impressions are attributable, the impressions totalization structure 800 is provided with a UUIDs column 804. A value of 100,000 in the UUIDs column 804 is indicative of 100,000 unique users. Thus, the first entry of the impressions totalization structure 800 indicates that 100,000 unique users (i.e., UUIDs=100,000) were exposed once (i.e., frequency=1) in a single day to a particular ad campaign.

To track impressions based on exposure frequency and UUIDs, the impressions totalization structure 800 is provided with an impressions column 806. Each impression count stored in the impressions column 806 is determined by multiplying a corresponding frequency value stored in the frequency column 802 with a corresponding UUID value stored in the UUID column 804. For example, in the second entry of the impressions totalization structure 800, the frequency value of two is multiplied by 200,000 unique users to determine that 400,000 impressions are attributable to a particular ad campaign.

Turning to FIG. 9, an ad campaign-level age/gender and impression composition data structure 900 is shown, which, in the illustrated example, may be generated by the report generator 412 of FIG. 4. The impression data in the ad campaign-level age/gender and impression composition structure 900 of FIG. 9 corresponds to impressions attributable to registered user of a particular partner database (DB) proprietor (e.g., the partner A database proprietor 104*a* of FIGS. 1 and 2 or the partner B database proprietor 104*b* of FIG. 1). Similar tables can be generated for content and/or other media. Additionally or alternatively, other media in addition to advertisements may be added to the data structure 900.

The ad campaign-level age/gender and impression composition structure 900 is provided with an age/gender column 902, an impressions column 904, a frequency column 906, and an impression composition column 908. The age/gender column 902 of the illustrated example indicates different age/gender demographic groups. The impressions column 904 of the illustrated example stores values indicative of the total impressions for a particular ad campaign for corresponding age/gender demographic groups. The frequency column 906 of the illustrated example stores values indicative of the frequency of exposure per user for the ad campaign that contributed to the impressions in the impressions column 904. The impressions composition column 908 of the illustrated example stores the percentage of impressions for each of the age/gender demographic groups.

In some examples, the demographics analyzer 406 and the demographics modifier 408 of FIG. 4 perform demographic accuracy analyses and adjustment processes on demographic information before tabulating final results of impression-based demographic information in the campaign-level age/gender and impression composition table 900. This can be done to address a problem facing online audience measurement processes in that the manner in which registered users represent themselves to online database proprietors (e.g., the partners 104*a* and 104*b*) is not necessarily veridical (e.g., truthful and/or accurate). In some instances, example approaches to online measurements that leverage account registrations at such online database proprietors to determine demographic attributes of an audience may lead to inaccurate demographic-exposure results if they rely on self-reporting of personal/demographic information by the registered users during account registration at the database proprietor site. There may be numerous reasons for why users report erroneous or inaccurate demographic information when registering for database proprietor services. The self-reporting registration processes used to collect the demographic information at the database proprietor sites (e.g., social media sites) does not facilitate determining the veracity of the self-reported demographic information. In some examples, to analyze and/or adjust inaccurate demographic information, the demographics analyzer 406 and/or the demographics modifier 408 may use example methods, systems, apparatus, and/or articles of manufacture disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

Although the example ad campaign-level age/gender and impression composition structure 900 shows impression statistics in connection with only age/gender demographic information, the report generator 412 of FIG. 4 may generate the same or other data structures to additionally or alternatively include other types of demographic information. In this manner, the report generator 412 can generate the impression reports 106a (FIGS. 1 and 4) to reflect impressions based on different types of demographics and/or different types of media.

FIGS. 10-13 are flow diagrams representative of machine readable instructions that can be executed to implement the apparatus and systems of FIGS. 1, 2, 3, and/or 4. The example processes of FIGS. 10-13 may be implemented using machine readable instructions that, when executed, cause a device (e.g., a programmable controller or other programmable machine or integrated circuit) to perform the operations shown in FIGS. 10-13. In this example, the machine readable instructions comprise a program for execution by a processor such as the processor 2912 shown in the example computer 2910 discussed below in connection with FIG. 29. The program may be embodied in software stored on a tangible computer readable medium such as a CD-ROM, a floppy disk, a hard drive, a digital versatile disk (DVD), a BluRay disk, a flash memory, a read-only memory (ROM), a random-access memory (RAM), or a memory associated with the processor 2912, but the entire program and/or parts thereof could alternatively be executed by a device other than the processor 2912 and/or embodied in firmware or dedicated hardware.

As used herein, the term tangible computer readable medium is expressly defined to include any type of computer readable storage and to exclude propagating signals. Additionally or alternatively, the example processes of FIGS. 10-13 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Alternatively, the example processes of FIGS. 10-13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 10-13 may be implemented as any combination(s) of any of the foregoing techniques, for example, any combination of firmware, software, discrete logic and/or hardware.

Although the example processes of FIGS. 10-13 are described with reference to the flow diagrams of FIGS. 10-13, other methods of implementing the apparatus and systems of FIGS. 1, 2, 3, and/or 4 may be employed. For example, the order of execution of the blocks may be changed, and/or some of the blocks described may be changed, eliminated, sub-divided, or combined. Additionally, one or both of the example processes of FIGS. 10-13 may be performed sequentially and/or in parallel by, for example, separate processing threads, processors, devices, discrete logic, circuits, etc.

Figure 10:
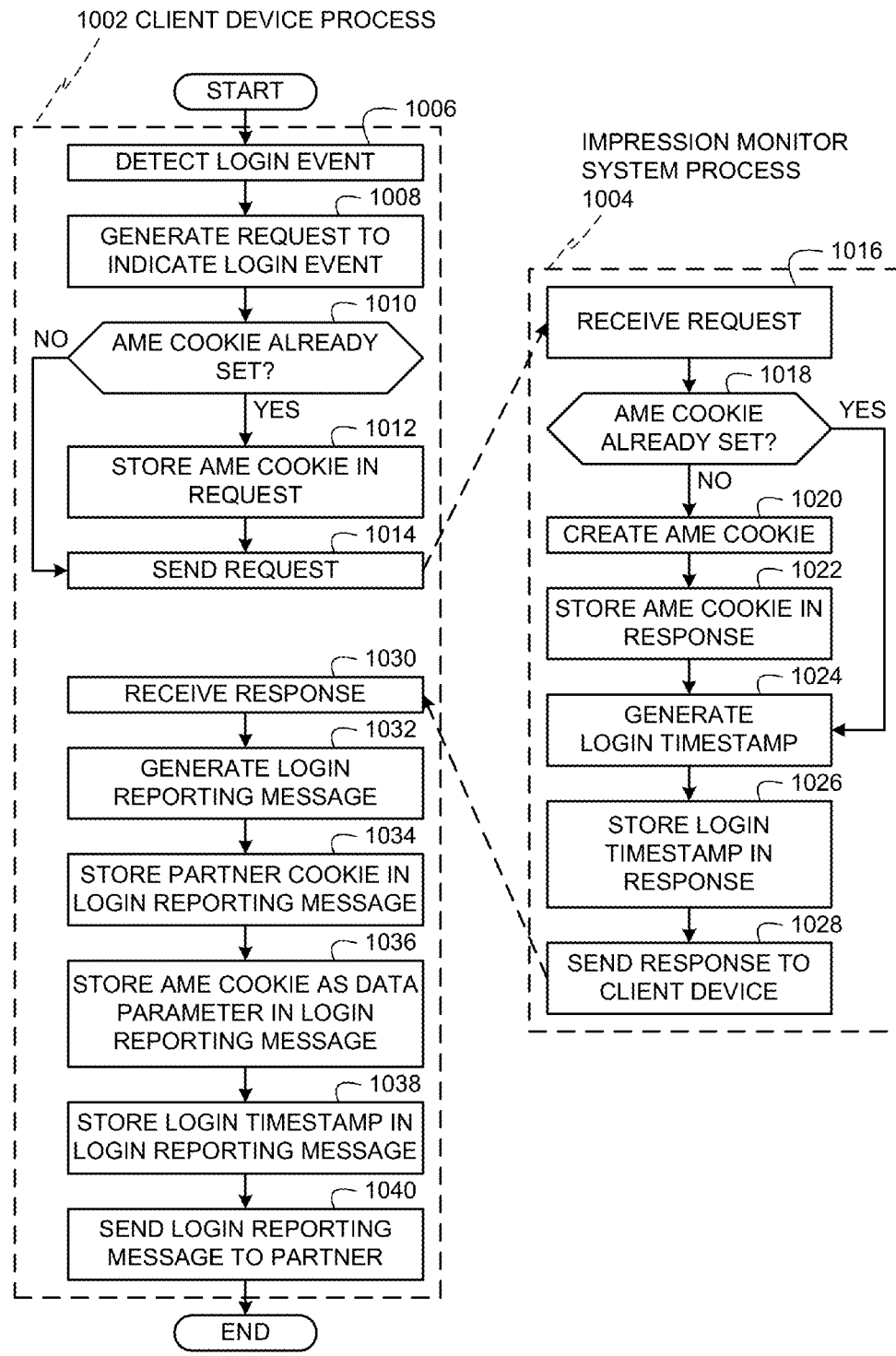
FIG. 10 is a flow diagram representative of example machine readable instructions that may be executed to report login events and user cookies to database proprietors.

Turning in detail to FIG. 10, the depicted example processes may be used to report login events and user cookies (e.g., the AME cookie 208 and the partner A cookie 228 of FIGS. 2 and 3) to database proprietors (e.g., the partner A database proprietor 104a of FIGS. 1 and 2). In the illustrated example, the flow diagram shows a client device process 1002 and an impression monitor system process 1004. In the illustrated example, the client device process 1002 may be performed by the cookie reporter 202 of FIGS. 2 and 15, and the impression monitor system process 1004 may be implemented by the impression monitor system 102 of FIGS. 1-3 and 14. The example processes of FIG. 10 are described in connection with FIG. 2 as interactions between the client device 108, the impression monitor system 102, and the partner A database proprietor 104a. However, processes similar or identical to the example processes of FIG. 10 may be performed at any time or at the same time between other client devices, the impression monitor system 102 and/or other database proprietors to accomplish the same type of user login reporting events when users login to login pages (e.g., the login page 204 of FIG. 2) of respective database proprietors (e.g., the database proprietors 104a and 104b of FIGS. 1 and 2).

Initially, as part of the client device process 1002, the login event detector 1502 (FIG. 15) detects a login event (block 1006). The login event may be, for example, a user of the client device 108 logging into the login page 204 of FIG. 2. The message generator 1508 (FIG. 15) generates the request 206 (FIG. 2) to indicate the login event (block 1008). The cookie status detector 1504 (FIG. 15) determines whether an AME cookie (e.g. the AME cookie 208 of FIG. 2) is already set in the client device 108 (block 1010). If the AME cookie 208 is already set, the cookie interface 1506 (FIG. 15) and/or the message generator 1508 store(s) the AME cookie 208 (e.g., a name-value pair identifying a user) in the request 206 (block 1012). After storing the AME cookie 208 in the request 206 (block 1012) or if the AME cookie 208 is not already set in the client device (block 1010), the communication interface 1510 (FIG. 15) sends the request 206 to the impression monitor system 102 (block 1014).

As shown in the example impression monitor system process 1004, the communication interface 1412 (FIG. 14) receives the request 206 (block 1016), and the cookie status detector 1402 (FIG. 14) determines whether the AME cookie 208 is already set in the client device 108 (block 1018). For example, the cookie status detector 1402 can determine whether the AME cookie 208 is already set based on whether the request 206 contains the AME cookie 208. If the cookie status detector 1402 determines that the AME cookie 208 is not already set (block 1018), the cookie generator 1404 (FIG. 14) creates the AME cookie 208 (block 1020). For example, the cookie generator 1404 can generate the AME cookie 208 by generating a UUID for the client device 108. The message generator 1408 (FIG. 14) stores the AME cookie 208 in the response 216 (FIG. 2) (block 1022).

After storing the AME cookie 208 in the response 216 (block 1022) or if the cookie status detector 1402 determines at block 1018 that the AME cookie 208 is already set in the client device 108, the timestamp generator 1406 generates a login timestamp (e.g., the login timestamp 220 of FIG. 2) (block 1024) to indicate a login time for the detected login event. The message generator 1408 stores the login timestamp 220 in the response 216 (block 1026), and the communication interface 1412 sends the response 216 to the client device 108 (block 1028).

Returning to the client device process 1002, the communication interface 1510 (FIG. 15) receives the response 216 (block 1030), and the message generator 1508 (FIG. 15) generates the login reporting message 118 (FIGS. 1 and 2) (block 1032). If present, the cookie interface 1506 (FIG. 15) and/or the message generator 1508 store(s) a partner cookie corresponding to the login event detected at block 1006 (e.g., the partner A cookie 228) in the login reporting message 118 (block 1034). If a corresponding partner cookie is not present in the client device 108, a partner cookie is not stored in the login reporting message 118 to indicate to the corresponding partner that it should create a partner cookie for the client device 108. In addition, the cookie interface 1506 and/or the message generator 1508 store(s) the AME cookie 208 as a data parameter (e.g., in the payload 232) in the login reporting message 118 (block 1036). The message generator 1508 also stores the login timestamp 220 in the login reporting message 118 (e.g., in the payload 232) (block 1038). The communication interface 1510 sends the login reporting message 118 to a corresponding partner database proprietor (e.g., the partner A database proprietor 104a) (block 1040). In this manner, the cookie reporter 202 enables the partner A database proprietor 104a to map the partner A cookie 228 to the AME cookie 208 and the login timestamp 220 in the partner cookie map 236 of FIGS. 2 and 5. The example process of FIG. 10 then ends.

Figure 11:
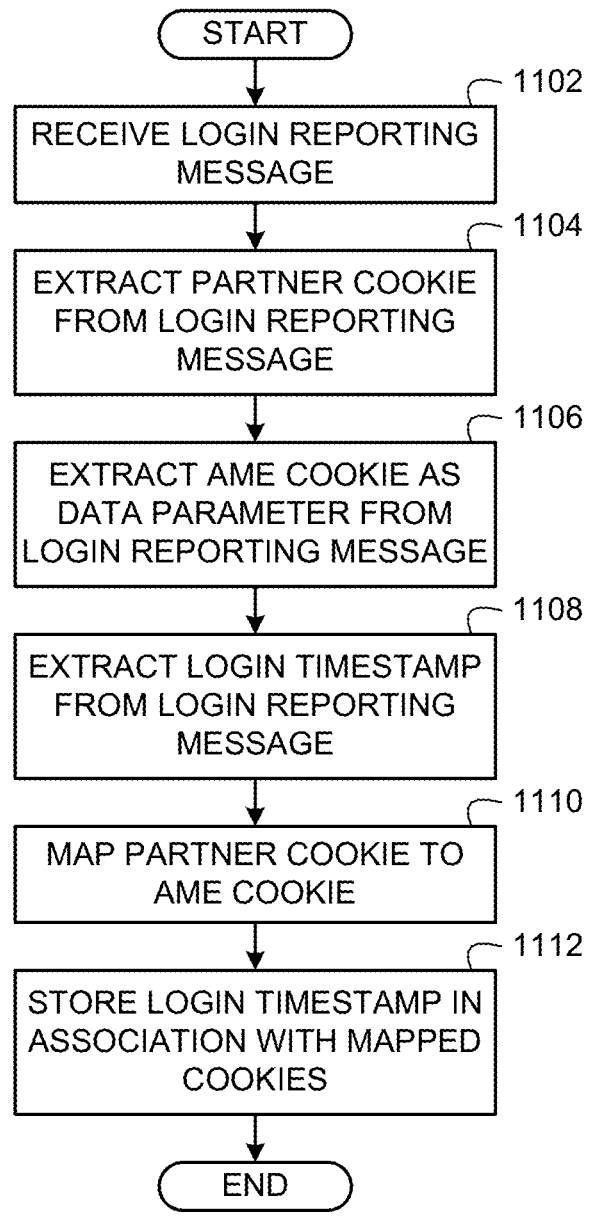
FIG. 11 is a flow diagram representative of example machine readable instructions that may be executed to map audience measurement entity (AME) cookie identifiers to user identifiers of users registered with a database proprietor.

Turning now to FIG. 11, the depicted flow diagram is representative of an example process that may be performed by a partner database proprietor (e.g., the partner database proprietors 104a and/or 104b of FIGS. 1 and 2) to map AME cookie identifiers (e.g., a UUID of the AME cookie 208 of FIG. 2) with user identifiers (e.g., a UUID of the partner A cookie 228 of FIG. 2) of users registered with the partner database proprietor. While for simplicity, FIG. 11 refers to a process receiving a single login message, many such processes may exist and execute in parallel (e.g., parallel threads). The example process of FIG. 11 is described in connection with the illustrated example of FIG. 2, the apparatus 400 of FIG. 4, and the partner A database proprietor 104a. However, processes similar or identical to the example processes of FIG. 11 may be performed at any time or at the same time by other partner database proprietors and/or other apparatus to accomplish the same type of cookie mapping process.

Initially, the partner A database proprietor 104a receives the login reporting message 118 (FIGS. 1 and 2) (block 1102). The data parser 414 (FIG. 4) extracts the partner A cookie 228 (block 1104) from the login reporting message 118. In the illustrated example, the data parser 414 extracts the partner A cookie 228 from the cookie field 230 of the login reporting message 118. The data parser 414 extracts the AME cookie 208 (block 1106) from the login reporting message 118. In the illustrated example, the data parser 414 extracts the AME cookie 208 as a data parameter from the payload 232 of the login reporting message 118. In addition, the data parser 414 extracts the login timestamp 220 from the login reporting message 118 (block 1108). The mapper 416 (FIG. 4) maps the partner A cookie 228 to the AME cookie 208 (e.g., maps the UUIDs of each cookie to one another) (block 1110) in, for example, the partner cookie map 236 of FIGS. 2 and 5. In addition, the mapper 416 stores the login timestamp 220 in association with the mapped cookies (block 1112) in the partner cookie map 236. The example process of FIG. 11 then ends.

Figure 12:
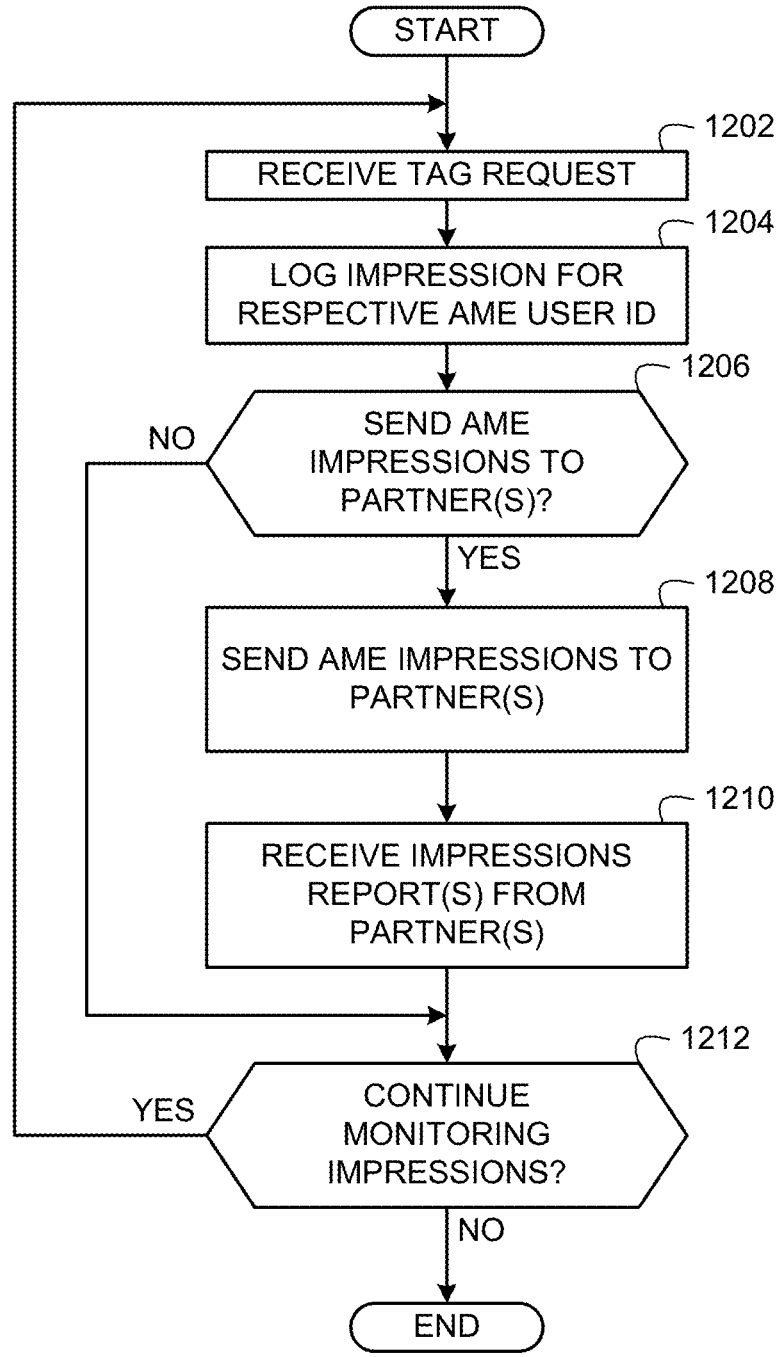
FIG. 12 is a flow diagram representative of example machine readable instructions that may be executed to log impressions.

Now turning to FIG. 12, the depicted example process may be performed to log impressions. In the illustrated example, the example process of FIG. 12 is described in connection with FIGS. 3 and 14 as being performed by the impression monitor system 102 based on tag requests received from the client device 108. However, processes similar or identical to the example process of FIG. 12 may be performed at any time or at the same time (e.g., multiple threads may be spawned and execute in parallel) by the impression monitor system 102 in connection with other client devices (e.g., any of the client devices 108 of FIG. 1 or any other client devices) to log impressions attributable to those client devices.

Initially, the communication interface 1412 (FIG. 14) receives a tag request (e.g., the tag request 112 of FIGS. 1 and 3) (block 1202). The impression logger 1410 (FIG. 14) logs an impression for an AME UUID indicated by the AME cookie 208 (block 1204). In the illustrated example, the impression logger 1410 logs the impression in the AME impression store 114 of FIGS. 1, 3, and 6. The impression logger 1410 determines whether it should send the AME impression logs 122 (FIGS. 1 and 4) to one or more partner database proprietors (block 1206). For example, the impression logger 1410 may be configured to periodically or aperiodically send the AME impression logs 122 to one or more partner database proprietors (e.g., the partner database proprietors 104a and 104b of FIGS. 1 and 2) based on one or more of a schedule and/or a threshold of logged impressions.

If the impression logger 1410 determines that it should send the AME impression logs 122 to one or more partner database proprietors (block 1206), the communication interface 1412 sends the AME impression logs 122 to the one or more partner database proprietors (block 1208). In response, the communication interface 1412 receives one or more impression reports (e.g., the impression reports 106a and 106b of FIGS. 1 and 4) from the one or more partner database proprietors (block 1210). In some examples, the impression monitor system 102 applies weighting factors to impression audience data in impression reports from different database proprietors (e.g., the partner database proprietors 104a and 104b). In some examples, the weighting factors are determined for each database proprietor based on, for example, demographic distributions and/or impression distributions in the impression data and/or sample sizes (e.g., the quantity of registered users of a particular database proprietor, the quantity of registered users monitored for the particular database proprietor, and/or the quantity of impressions logged by the AME 103 for registered users of the particular database proprietor).

After receiving the one or more impression reports (block 1210) or if at block 1206 the impression logger 1410 determines that it should not send the AME impression logs 122 to one or more partner database proprietors, the impression monitor system 102 determines whether it should continue to monitor impressions (block 1212). For example, the impression monitor system 102 may be configured to monitor impressions until it is turned off or disabled. If the impression monitor system 102 determines that it should continue to monitor impressions (block 1212), control returns to block 1202. Otherwise, the example process of FIG. 12 ends.

Figure 13:
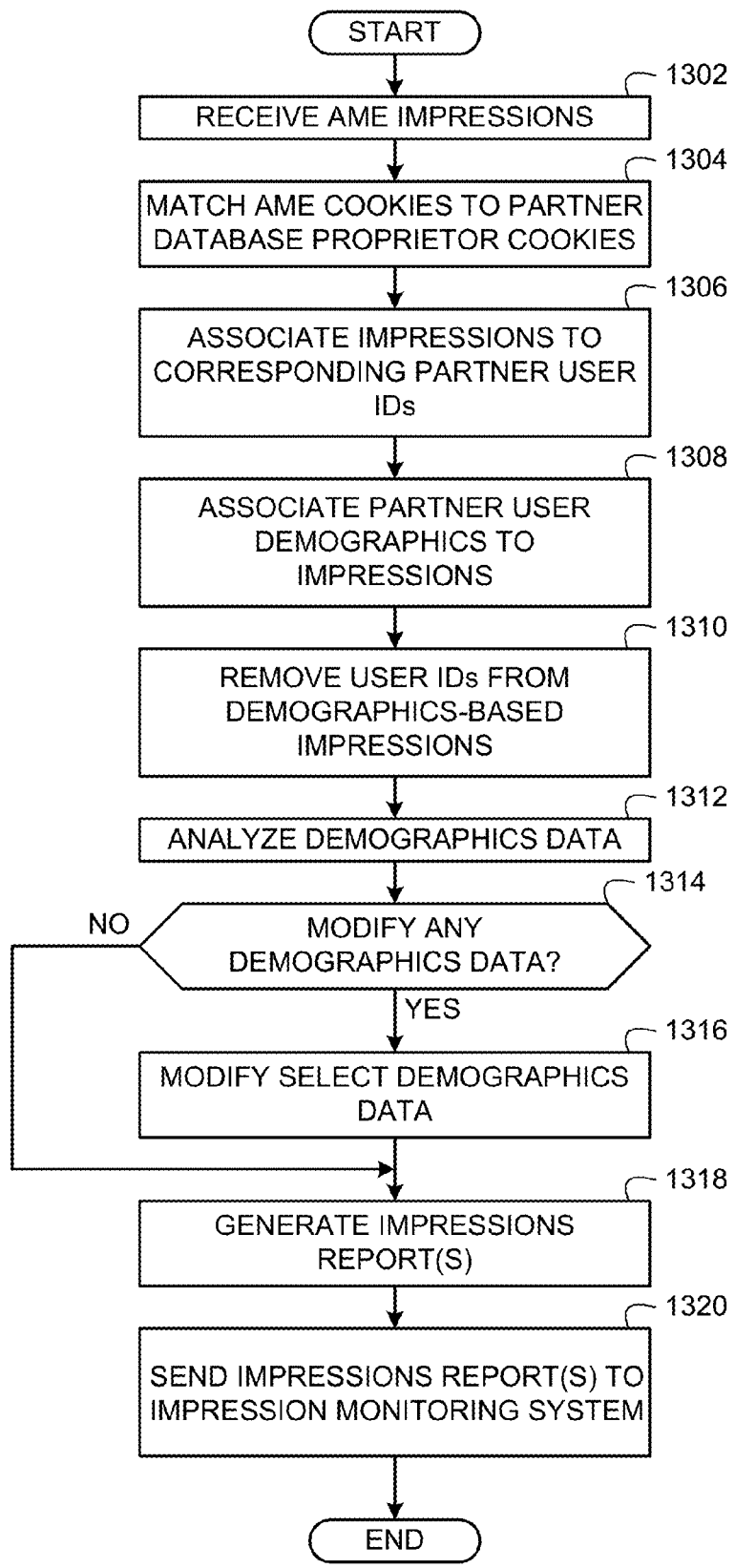
FIG. 13 is a flow diagram representative of example machine readable instructions that may be executed to generate demographics-based impressions reports.

Turning now to FIG. 13, the depicted example process may be used to generate demographics-based impressions reports (e.g., the impression reports 106a and 106b of FIGS. 1 and 4). The example process of FIG. 13 is described in connection with FIG. 4 as being implemented by the example apparatus 400 via the partner A database proprietor 104a. However, processes similar or identical to the example process of FIG. 13 may be performed at any time or at the same time by any other partner database proprietor(s) to generate impression reports based on registered users of those partner database proprietor(s).

Initially, the apparatus 400 receives the AME impression logs 122 (FIG. 4) (block 1302). The cookie matcher 402 (FIG. 4) matches AME cookies to partner database proprietor cookies (block 1304). For example, the cookie matcher 402 can use a cookie map of the corresponding database proprietor (e.g., the partner A cookie map 236 (FIG. 4)) to match UUIDs from AME cookies (e.g., the AME cookie 208 of FIGS. 2 and 3) indicated in the AME impression logs 122 to UUIDs from partner database proprietor cookies (e.g., the partner A database proprietor cookie 228 of FIGS. 2 and 3). The cookie matcher 402 then associates impressions (e.g., impressions noted in the AME impression logs 122) to corresponding partner database proprietor UUIDs (block 1306) based on matches found at block 1304. For example, the cookie matcher 402 may generate the partner-based impressions data structure 700 described above in connection with FIG. 7.

The demographics associator 404 (FIG. 4) associates demographics of registered users of the corresponding database proprietor (e.g., the partner A database proprietor 104a) to the impressions (block 1308). For example, the demographics associator 404 may retrieve demographics information from the user accounts database 238 (FIGS. 2 and 4) for partner user IDs noted in the partner user ID column 712 of the partner-based impressions data structure 700.

The user ID modifier 410 removes user IDs from the demographics-based impressions data structure 700 (block 1310). For example, the user ID modifier 410 can remove UUIDs from the AME user ID column 702 corresponding to AME cookies (e.g., the AME cookie 208 of FIGS. 2 and 3) and the partner user ID column 712 corresponding to partner cookies (e.g., the partner A cookie 228 of FIGS. 2 and 3). In other examples, the report generator 412 can copy selected portions from the demographics-based impressions data structure 700 and store the selected portions in a report without copying over the user IDs. In this manner, the apparatus 400 can obfuscate identities of registered users to protect their privacy when the demographics-based impressions are shared with others (e.g., an audience measurement entity).

The demographics analyzer 406 (FIG. 4) analyzes the demographics information (block 1312) that was associated with the impressions at block 1308. The demographics analyzer 406 determines whether any demographics information needs to be modified (block 1314). If any of the demographics information needs to be modified (e.g., demographics information needs to be changed or added due to being incomplete and/or inaccurate), the demographics modifier 408 (FIG. 4) modifies select demographics data needing modification (block 1316). In the illustrated example, the demographics analyzer 406 and/or the demographics modifier 408 may perform the operations of blocks 1312, 1314, and 1316 to analyze and/or modify demographics information using, for example, one or more example techniques disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

After modifying demographics information at block 1316 or if at block 1314 the demographics analyzer 406 determines that none of the demographics information requires modification, the report generator 412 generates one or more impression reports (e.g., the impression reports 106a of FIGS. 1 and 4) (block 1318). For example, the report generator 412 may generate one or more of the impression reports 106a using one or more example techniques described above in connection with FIGS. 8 and 9 and/or using any other suitable technique(s). The apparatus 400 then sends the one or more impression reports 106a to the impression monitor system 102 (block 1320). In the illustrated example, the impression reports 106a are indicative of demographic segments, populations, or groups associated with different AME cookies 208 (and corresponding partner A cookies 228) and that were exposed to media (e.g., advertisements, content, and/or other media) identified by campaign IDs and/or other the media content IDs. The example process of FIG. 13 then ends.

Figure 16:
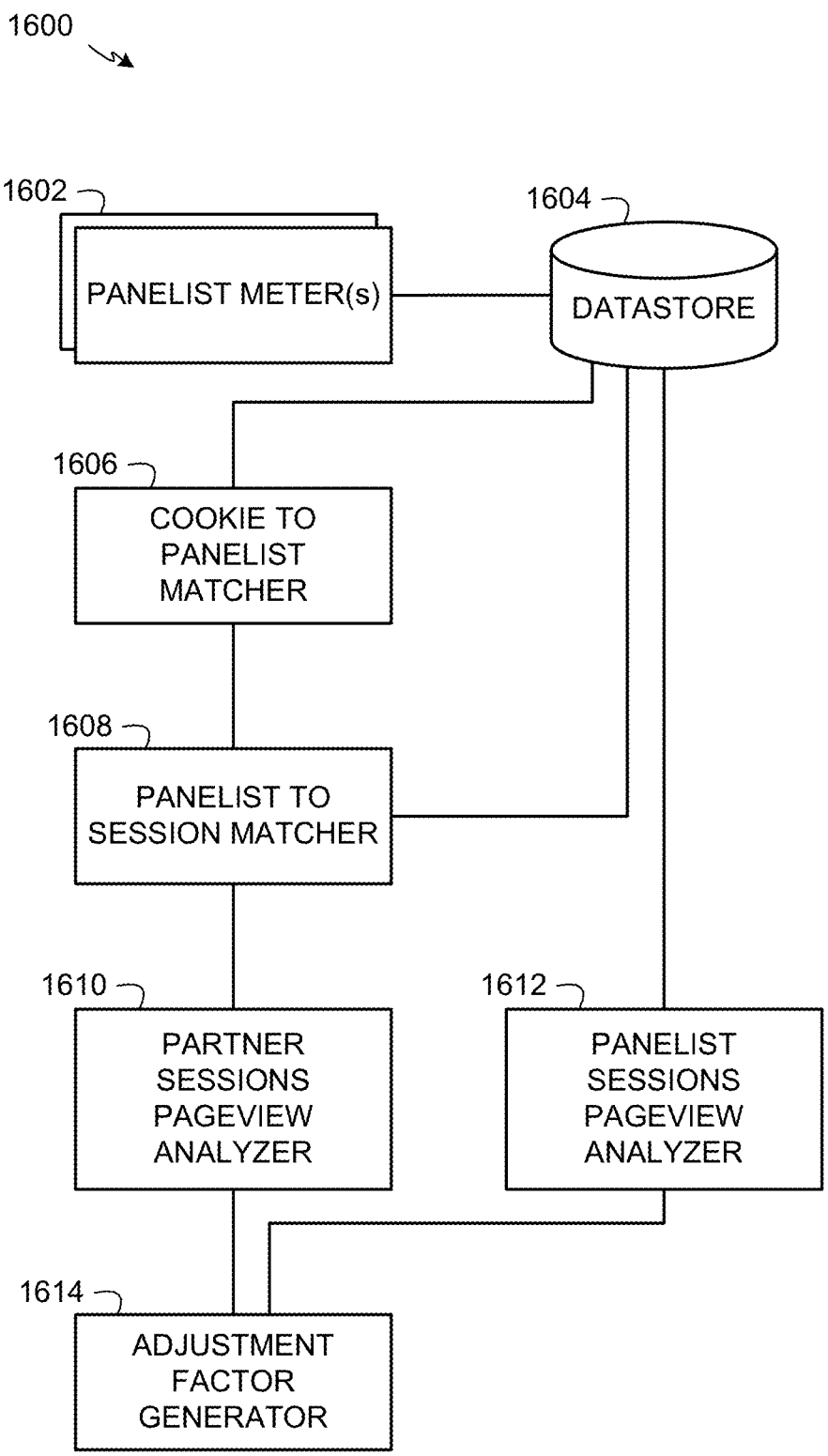
FIG. 16 is a block diagram of an example system to generate an adjustment factor.

FIG. 16 is a block diagram of an example system 1600 to generate an adjustment factor. For example, the system 1600 may generate an adjustment factor to determine more accurate information based on the information generated in accordance with the methods and apparatus described in conjunction with FIGS. 1-15. The example system 1600 includes one or more panelist meter(s) 1602, a datastore 1604, a cookie to panelist matcher 1606, a panelist to session matcher 1608, a partner sessions pageview analyzer 1610, a panelist sessions pageview analyzer 1612, and an adjustment factor generator 1614.

The panelist meter(s) 1602 collect information about computing activity on traditional panelists' computers. According to the illustrated example, the panelist meter(s) 1602 are implemented by software that is installed on traditional panelists' computers. Alternatively, any other type of panelist meter(s) 1602 may be utilized. For example, the panelist meter(s) 1602 may be partly or entirely implemented by a device associated with a computer.

The panelist meter(s) 1602 of the illustrated example collect information about computing sessions. For example, a computing session may begin when a user logs into the computer, when a user opens a web browser, when the user requests media from a media provider, when a user identifies themselves to the panelist meter(s) 1602, etc. The panelist meter(s) 1602 of the illustrated example determine a user associated with a computing session by prompting a user to identify themselves. The panelist meter(s) 1602 also determine an end of a computing session. For example, the panelist meter(s) 1602 may determine that a computing session has ended when a user logs out of the computer, when a user closes a web browser, after a period of time in which there is no user input to the computer, etc. The computing session information is stored in the datastore 1604. For the computing session information may be stored in a table as shown in FIG. 17.

According to the example illustrated in FIG. 17, the table includes a meter_id field that identifies the panelist meter that collected the information, a member_id field identifying the user associated with the computing session, a computer_id field identifying the computer, a start_time field identifying the start of the computing session, and an end_time field identifying the end of the computing session.

The panelist meter(s) 1602 of the illustrated example also collects information about requests to and responses from media providers. The panelist meter(s) 1602 also collect information about cookies that identify a user to a media provider and/or a partner database provider. For example, when a tag request is sent to a partner database provider, the tag request and a cookie identifying the user to the partner database provider (if one exists) are logged by the panelist meter(s) 1602. In some examples, the cookie is only logged when it is set on the computer instead of logging the cookie each time it is sent with a tag request. The logged information is stored in the datastore 1604. For example, the logged information may be stored as shown in FIG. 18.

According to the example illustrated in FIG. 18, the logged information includes a cookie_value field identifying the recorded cookie value, a meter_id field that identifies the panelist meter that logged the information, a computer_id field identifying the computer, and a local_time field indicating the time that the cookie value was established (e.g., the time that the user logged in and the cookie was set on the user's computer).

The datastore 1604 of the illustrated example of FIG. 16 stores data received from the panelist meter(s) 1602 and transmits the data to one or more of the cookie to panelist matcher 1606, the partner to session matcher 1608, and the panelist sessions pageview analyzer 1612. In some examples, the datastore 1604 may also store data generated by one or more of the cookie to panelist matcher 1606, the panelist to session matcher 1608, the partner sessions pageview analyzer 1610, and the panelist sessions pageview analyzer 1612. The datastore 1604 may additionally or alternatively store data from or transmit data to any other element.

The cookie to panelist matcher 1606 of the illustrated example analyzes the information about computing sessions and the information about partner cookies from the panelist meter(s) 1602 to determine an association of partner cookies and panelist members. The example cookie to panelist matcher 1606 compares the time at which a partner cookie is set (e.g., the time identified in the table of FIG. 18) to computing session start and end times (e.g., the start and end times in the table of FIG. 17) to determine an association of cookies to computing sessions. The example cookie to panelist matcher 1606 also determines a panelist member identified for matching sessions (e.g., from the member ID in the table of FIG. 17).

The cookie to panelist matcher 1606 of the illustrated example subtotals the number of times that a cookie is associated with each panelist member to generate the table of FIG. 19. As shown in the example table of FIG. 19, cookie 100000964240495 is associated with computing sessions of member ID 1 twice and is associated with member ID 2 once. According to the illustrated example, the cookie to panelist matcher 1606 determines that cookie 100000964240495 is associated with member ID 1 because the count for member ID 1 is greater than the count for member ID 2. Accordingly, the example cookie to panelist matcher 1606 generates the table of FIG. 20, which associates the cookie with the panelist member. The association illustrated in the example of FIG. 20 indicates a determination as to which panelist member is associated with a particular partner cookie. This process enables demographic information known for the panelist member to be associated with the partner cookie.

The panelist to session matcher 1608 of the illustrated example utilizes the panelist to partner cookie association from the cookie to panelist matcher 1606 and the information about partner cookie instances from the panelist meter(s) 1602 to determine the start and end of partner cookie sessions. An example partner cookie to panelist association is illustrated in FIG. 21 (this table is similar to the table illustrated in FIG. 20, but includes an additional panelist member for further explanation). An example listing of partner cookie instances is illustrated in FIG. 22 (this table is similar to the table illustrated in FIG. 18, but includes an additional partner cookie for further explanation). The example panelist to session matcher 1608 uses the partner cookie instance times to generate a listing of partner cookie sessions as illustrated in FIG. 23. A flowchart of an example method for generating the listing of partner cookie sessions is described in conjunction with the flowchart of FIG. 28.

The partner sessions pageview analyzer 1610 of the illustrated example determines demographic information associated with media provider pageviews using the listing of partner cookie sessions from the panelist to session matcher 1608. The demographic information for the pageviews simulates the demographic information that would be associated with such media provider pageviews using the methods and apparatus described in conjunction with FIGS. 1-15. The demographic information is determined by retrieving the demographic information from the panelist information determined to be associated with the partner cookies because the demographic information from the partner is typically not available due to privacy restrictions. The example partner sessions pageview analyzer 1610 aggregates information based on gender and age to determine a number of pageviews as shown in column 2402 of FIG. 24.

The panelist sessions pageview analyzer 1612 of the illustrated example determines demographic information associated with media provider pageviews using the panelist member information determined by the panelist meter(s) 1602. For example, where the panelist meter(s) 1602 prompt users of the computing device to input their identity, the demographic information utilized by the panelist sessions pageview analyzer 1612 is the demographic information associated with the panelist member identified in response to the prompting. The example panelist sessions pageview analyzer 1612 aggregates information based on gender and age to determine a number of pageviews as shown in column 2404 of FIG. 24. The identity of the user of the computing device determined based on the panelist meter(s) 1602 represents the control information against which the partner cookie demographic determination is compared.

The adjustment factor generator 1614 of the illustrated example compares the pageview information from the partner sessions pageview analyzer 1610 with the pageview information from the panelist sessions pageview analyzer 1612 to determine an adjustment factor. The adjustment factor is a correction value to be applied to pageview counts determined using the partner cookie and partner databases. In other words, the adjustment factor represents the statistical difference between demographic information determined using the partner cookie (e.g., according to the methods and apparatus of FIGS. 1-15) and demographic information determined from the panelist meter(s) 1602. For example, column 2406 of FIG. 24 indicates an adjustment factor calculated for each demographic category by dividing the pageviews determined using demographic information from the partner cookie (column 2402) by the pageviews determined using the panelist meter(s) 1602 demographic information (column 2404). The "ALL" row of FIG. 24 indicates that 10,810 pageviews (40,943–30,133) had no partner cookie associated with them, which results in an adjustment factor 74%. In other words, determining pageviews using the partner cookie accounts for 74% of pageviews and an pageview count determined based on the partner cookies should be scaled according (e.g., pageviews determined using partner cookie should be divided by 0.74) to account for pageviews by computing devices having no partner cookie.

In some examples, the system 1600 may additionally or alternatively determine counts for unique users instead of individual pageviews by determining the number of unique users for a media provider using the panelist meter(s) 1602 and the partner cookie information. An example table illustrating counts and adjustment factors for unique audience is illustrated in FIG. 25.

While the foregoing described of the system 1600 of FIG. 16 refers to media provider pageviews, any other computing activity may be analyzed and demographic information may be associated with the computing activity.

FIGS. 26-29 are flow diagrams representative of machine readable instructions that can be executed to implement the apparatus and systems of FIG. 16. The example processes of FIGS. 26-29 may be implemented using machine readable instructions that, when executed, cause a device (e.g., a programmable controller or other programmable machine or integrated circuit) to perform the operations shown in FIGS. 26-29. In this example, the machine readable instructions comprise a program for execution by a processor such as the processor 2912 shown in the example computer 2910 discussed below in connection with FIG. 29. The program may be embodied in software stored on a tangible computer readable medium such as a CD-ROM, a floppy disk, a hard drive, a digital versatile disk (DVD), a BluRay disk, a flash memory, a read-only memory (ROM), a random-access memory (RAM), or a memory associated with the processor 2912, but the entire program and/or parts thereof could alternatively be executed by a device other than the processor 2912 and/or embodied in firmware or dedicated hardware.

As used herein, the term tangible computer readable medium is expressly defined to include any type of computer readable storage and to exclude propagating signals. Additionally or alternatively, the example processes of FIGS. 26-29 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Alternatively, the example processes of FIGS. 26-29 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 26-29 may be implemented as any combination(s) of any of the foregoing techniques, for example, any combination of firmware, software, discrete logic and/or hardware.

Although the example processes of FIGS. 26-29 are described with reference to the flow diagrams of FIGS. 26-29, other methods of implementing the apparatus and systems of FIG. 16 may be employed. For example, the order of execution of the blocks may be changed, and/or some of the blocks described may be changed, eliminated, sub-divided, or combined. Additionally, one or both of the example processes of FIG. 16 may be performed sequentially and/or in parallel by, for example, separate processing threads, processors, devices, discrete logic, circuits, etc.

Figure 26:
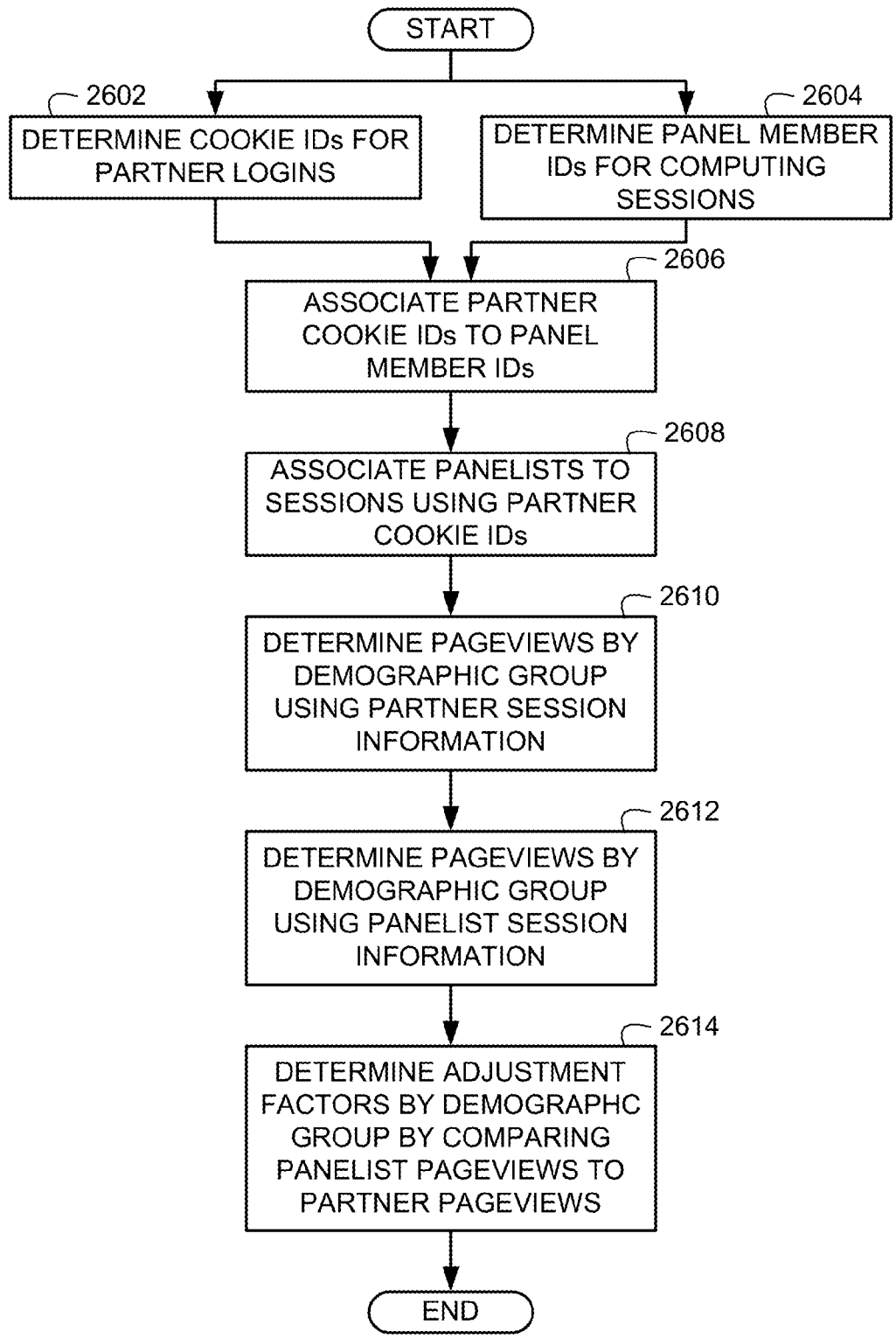
FIGS. 26 to 28 are flow diagrams representative of example machine readable instructions that may be executed generate adjustment factor(s).

The example process of FIG. 26 begins when the panelist meter(s) 1602 of FIG. 16 determine cookie identifiers for partner logins (block 2602) and determine panel member identifiers for computing sessions (block 2604). For example, the panelist meter(s) 1602 may meter a computing device for a period of time collecting the identified information. The panelist meter(s) 1602 may track the determined cookie identifiers for partner logins (block 2602) as illustrated in the example of FIG. 18. The panelist meter(s) may track the determined panel member identifiers for computing sessions (block 2604) as illustrated in the example of FIG. 17. The information tracked by blocks 2602 and 2604 may be stored at the panelist meter(s) 1602 and/or may be transmitted to the datastore 1604.

The example cookie to panelist 1606 then associates partner cookie identifiers with panelist member identifiers (block 2606). An example process for associating partner cookie identifiers with panelist member identifiers is described in conjunction with FIG. 27. The association of the partner cookie identifiers may be stored in a table or other data structure (e.g., the table illustrated in FIG. 20.

The example panelist to session matcher 1608 then associates panelists to computing sessions using the association determined in block 2606 (block 2608). While the panelist meter(s) 1602 associate panelists with computing sessions (e.g., by prompting users to identify themselves), the association of block 2608 determines (e.g., simulates) a matching of panelists (and their demographic information) that would be performed by the methods and apparatus of FIGS. 1-15. An example process for associating panelists to computing sessions is described in conjunction with FIG. 28.

Using the association from block 2608, the example partner sessions pageview analyzer 1610 determines pageviews by demographic group (block 2610). The pageviews information of block 2610 is indicative of the pageview counts that would be determined using partner cookie information in accordance with the methods and apparatus of FIGS. 1-15. According to the illustrated example, the session information in the table of FIG. 23 is used to associate pageviews at a particular time with a panelist member associated with a computing session using the partner cookie (rather than the panelist member identified by the panelist meter(s) 1602). The pageviews are then aggregated by demographic group.

Using panelist identity information from the panelist meter(s) 1602, the example panelist sessions pageview analyzer 1612 determines pageviews by demographic group (block 2612). The pageview information of block 2612 represents the baseline pageview count by demographic information that is assumed to be accurate. The recorded panelist member associated with a computer session (e.g., determined by prompting a user of a computing device) is utilized to determine demographic information associated with pageviews during a computing session. The pageviews are then aggregated by demographic group.

The adjustment factor generator 1614 then compares pageviews based on partner cookie information (from block 2608) to pageviews based on panelist member (from block 2610) to determine adjustment factor(s) by demographic group (block 2614). An example process for determining adjustment factors is described in conjunction with FIG. 29.

In one example, the count of pageviews by demographic using panelist session information (determined in block 2612) may be represented by $P_{i,j}$, where i is the index for media providers and j is the index for demographic groups. The count of pageviews by demographic using partner session information (determined in block 2610) may be represented by $P_{i,j}^{PART}$. In such an example, the adjustment factor $r_{i,j}^P$ for media provider i and demographic group j is determined as $$r_{i,j}^P = \frac{P_{i,j}^{PART}}{P_{i,j}}.$$

Similarly, an average monthly count of unique panelists belonging to demographic group may be represented by $UA_{i,j}$, where i is the index for media providers and j is the index for demographic groups. The average monthly count of unique panelists by demographic using partner session information may be represented by $UA_{i,j}^{PART}$. In such an example, the adjustment factor $r_{i,j}^{UA}$ for media provider i and demographic group j is determined as $$r_{i,j}^{UA} = \frac{UA_{i,j}^{PART}}{UA_{i,j}}.$$

In some examples, the adjustment factor is calculated at the category of sub-category level (e.g., an adjustment factor may be calculated for all media providers in the News category). For example, the adjustment factor may be calculated at the sub-category when unique audience for a given media provider and demographic group is less than 100.

Figure 27:
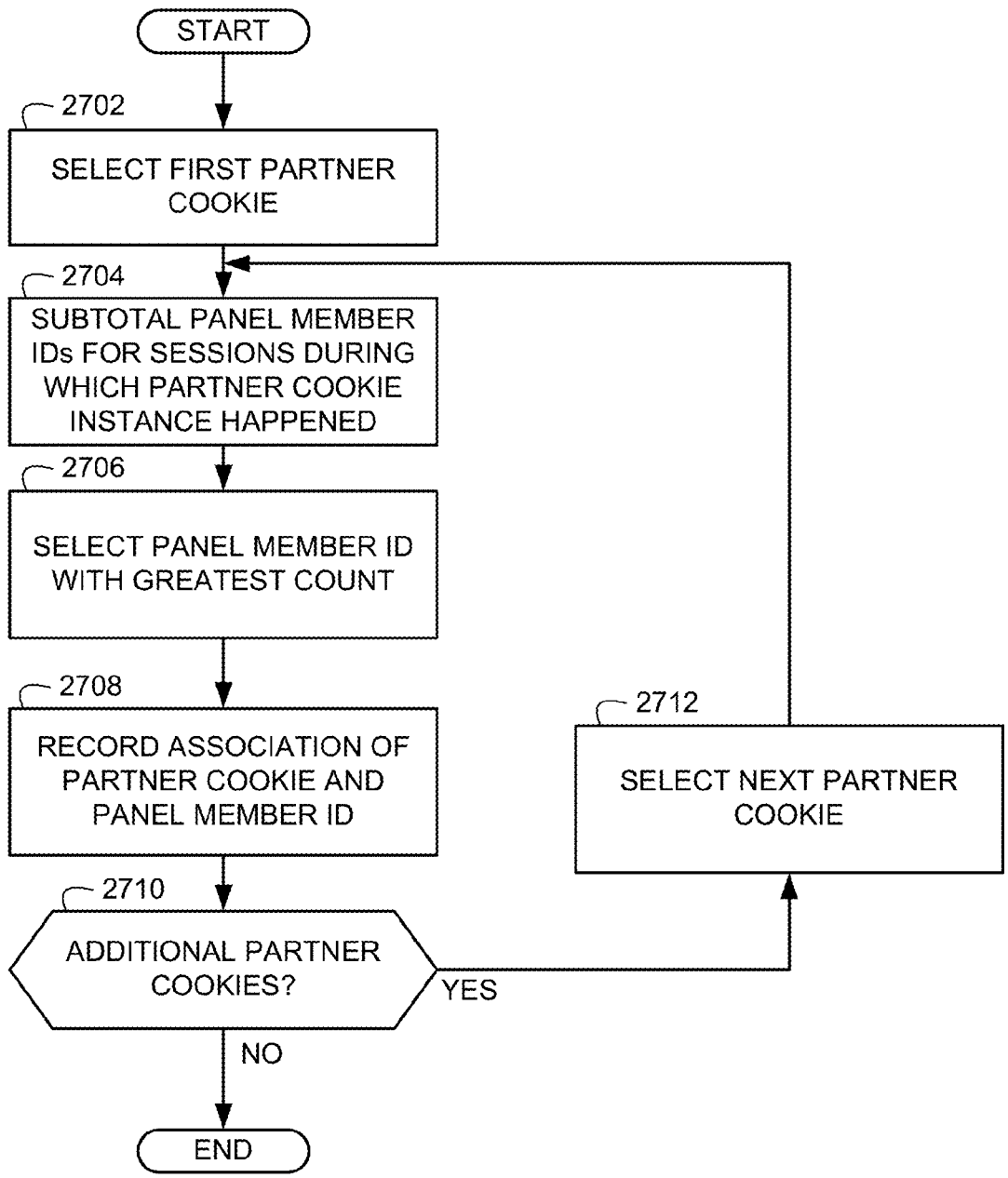

FIG. 27 is a flowchart of an example process to associate partner cookies and panel member identifiers. According to the illustrated example, the process of FIG. 27 is performed by the cookie to panelist matcher 1606 of FIG. 16. The example process begins by selecting a first partner cookie identified on a list of cookie instances (block 2702). For example, the partner cookies may be identified on a list as illustrated in FIGS. 18 and/or 22. Next, the cookie instances are matched with computing sessions (e.g., computing sessions identified in a table as illustrated in FIG. 17) and the panelist member identifiers associated with the matching computing sessions are subtotaled (block 2704). For example, the member identifiers may be subtotaled as illustrated in FIG. 19. The panel member identifier with the greatest count in the subtotal is selected (block 2706). An association of the selected partner cookie and the selected member identifier is recorded (block 2708). For example, the association may be recorded as shown in FIGS. 20 and 21.

After recording the association for the selected partner cookie, the cookie to panelist matcher 1606 determines if there are additional partner cookies to be processed (block 2710). If there are additional partner cookies to be processed, the next partner cookie is selected (block 2712) and control returns to block 2704 to process the partner cookie. If there are not additional partner cookies to be processed, the process of FIG. 27 completes. The completion of the process of FIG. 27 may result in initiation of the process of FIG. 28.

Figure 28:
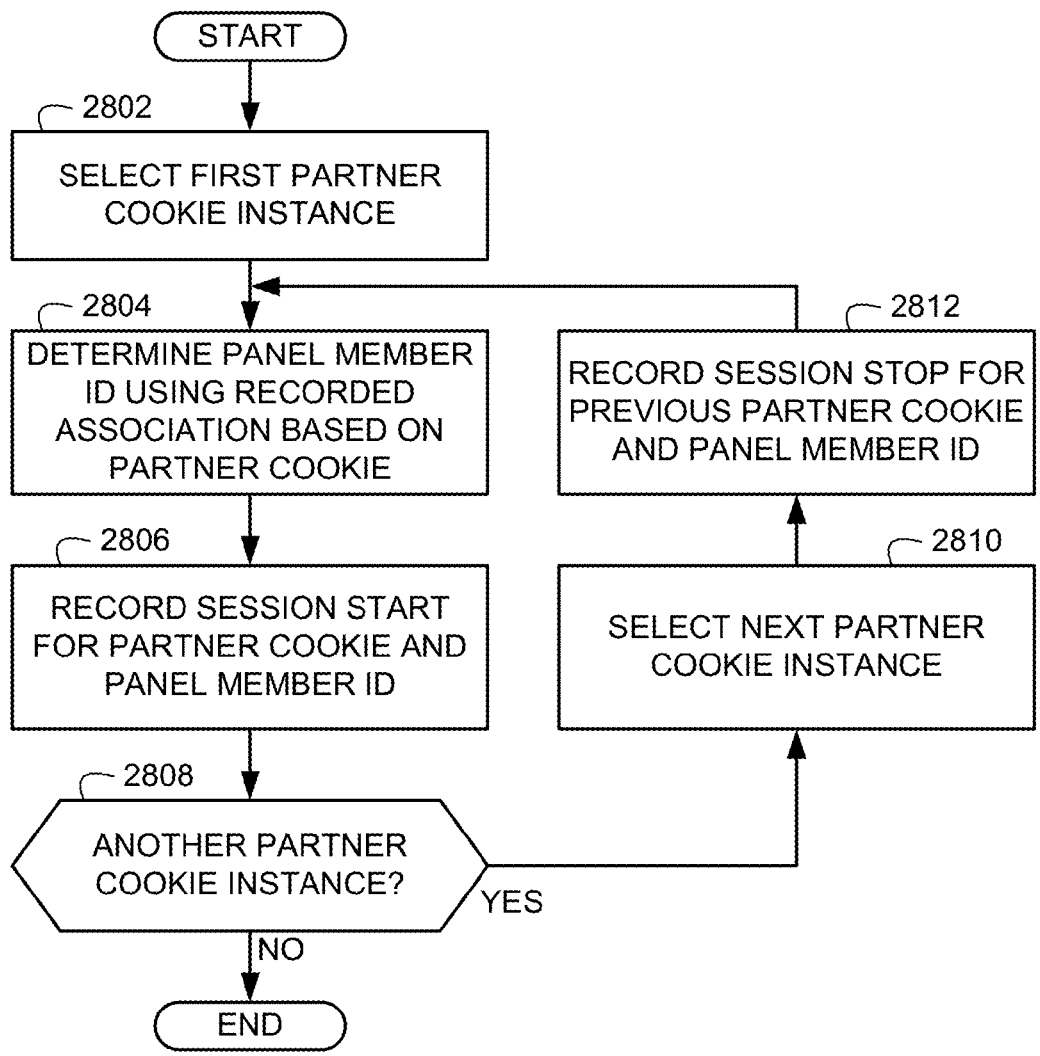

FIG. 28 is a flowchart of an example process to determine session information for panelist members based on cookie to panelist member association information determined by the process illustrated in FIG. 27. According to the illustrated example, the process of FIG. 28 is performed by the panelist to session matcher 1608 of FIG. 16. The example process begins by selecting a first partner cookie instance (block 2802). For example, the first partner cookie instance may be selected from a table of partner cookie instances such as the table illustrated in FIGS. 18 and 22. Next, a panel member identifier for the cookie instance is determined using the cookie to panelist member association information determined by the process illustrated in FIG. 27 (block 2804). The time of the cookie instance is recorded as a session start time for a computing session and the determined panel member identifier is associated with the session (block 2806). For example, the session information may be recorded as illustrated in FIG. 23.

After recording the session information, the panelist to session matcher 1608 determines if there are additional partner instances to be processed (block 2808). If there are additional partner cookie instances to be processed, the next partner cookie instance is selected (block 2810). The time of the newly selected cookie instance is recorded as the stop of the session for the previously selected panel member session (block 2812). In other words, the occurrence of each new cookie instance indicates the termination of the previous cookie instance (and thereby the end of a generated panel member browsing session). Control then returns to block 2804 to process the newly selected cookie instance.

If there are not additional partner cookie instances to be processed (block 2808), the process of FIG. 28 completes. The completion of the process of FIG. 28 may result in initiation of one or more of blocks 2610 and 2612.

In some examples, media (e.g., advertisements) is displayed across on several media providers in an advertising network. A measurement entity may not know in advance which media providers will be displaying advertisements. Furthermore, the demographics of different media providers vary depending on the targeted demographic of the webpage (e.g., a sport news webpage vs. an entertainment news webpage). Accordingly, the panelist meter(s) 1602 capture the domain name where media impressions appear (e.g., when the panelist meter(s) 1602 log an impression of an advertisement they also log the domain name of the media provider on which the advertisement was displayed). Where media is displayed on both advertising networks and non-advertising networks (advertisements are provided directly to some media providers), the domain name may be captured for a random sample (e.g., 20% of impressions).

To determine impressions for an advertising network a composite adjustment factor that is a combination of media provider adjustment factors weighted by impression volume during presentation of the media (e.g., during an advertising campaign) is determined. In some examples, the composite adjustment factor is computed on a daily basis.

As previously described, the adjustment factor $r_{i,j}^P$ and the unique audience adjustment factor $r_{i,j}^{UA}$ are computed. In addition, a proportion of impressions of the advertising network that are associated with a media provider i is represented by $p_{i,j}^{AN}$. For example, a particular media provider may account for 40% of counted impressions (i.e., $p_{i,j}^{AN}=0.40$). The impressions adjustment factor for advertising network AN and demographic group j is computed as $r_{AN,j}^P=\Sigma_i p_i^{AN} \times r_{i,j}^P$ and the unique audience adjustment factor is computed as $r_{AN,j}^P=\Sigma_i p_i^{AN} \times r_{i,j}^{UA}$. Thus, if there are two media providers in an advertising network and impressions are distributed such that media provider A represents 40% of impressions and media provider B represents 60% of impressions, the composite adjustment factor for the advertising network is computed as 0.4 multiplied by the adjustment factor for media provider A plus 0.6 multiplied by the adjustment factor for media provider B. Such composite adjustment factor can be computed for each of demographic group.

After computing adjustment factors, the adjustment factors can be applied to collected monitoring data (e.g., the entire universe of collected, a subset of collected data, etc.). In the following example a reporting entity is a media provider or an advertising network. The following measurement data may be determined by tagging and partner data provider measurement as described in conjunction with FIGS. 1-15. Impressions collected by webpage tagging for the United States for entity i may be represented by $I_i$ and impression collected by webpage tagging for global sites may be represented by $I_i^g$. Unique cookie counts for the United States may be represented by $I_{UC}$ and unique cookie counts for global sites may be represented by $I_{UC}^g$. Impressions determined using a partner database provider may be represented by $I_{i,j}^{PART}$ and unique audience counts determined using a partner database provider may be represented by $UA_{i,j}^{FB}$. As described above, the impressions adjustment factor for entity i and demographic group j may be represented by $r_{i,j}^P$ and the unique audience impressions factor may be represented by $r_{i,j}^{UA}$.

An international exclusion factor is determined as $$R_{i,c}^P = \frac{I_i}{I_i^g}.$$

This value indicates the proportion of global entities represented by the United States data.

To adjust the partner database provider data to match the total number of impressions determined using tagging, a scaling factor is computed as $$S_i^P = \frac{I_i}{\sum_j \frac{I_{i,j}^{PART}}{r_{i,j}^P}}.$$

Accordingly, the estimated impressions using the partner database provider is determined as $$\tilde{I}_{i,j} = S_i^P \times \frac{I_{i,j}^{PART}}{r_{i,j}^P}.$$

The unique audience international exclusion factor is determined as $$R_{i,c}^{UA} = \frac{I_{UC}}{I_{UC}^g}.$$

This value indicates the proportion of unique audience coming from the United States. To determine US unique audience counts using data from the partner database provider, the unique audience international exclusion factor is applied across the demographic groups to data from the partner database provider.

In examples where a total unique audience measurement is not available, it may be assumed that the frequency observed for a partner database provider is the same as the frequency for audience not observed by the partner database provider. Accordingly, a raw observed frequency is determined as $$f = \frac{R_{i,c}^P \times \sum_j I_{i,j}^{PART}}{R_{i,c}^{UA} \times \sum_j UA_{i,j}^{PART}}.$$

The target total unique audience is determined as $$\frac{I_i}{f}.$$

Without scaling, the sum of the adjusted unique audience across demographic groups is scaled by a scaling factor $$S_i^{UA} = \frac{\left(\frac{I_i}{f}\right)}{\sum_j \frac{UA_{i,j}^{PART}}{r_{i,j}^{UA}}}.$$

Accordingly, the unique audience estimation is determined as $$\tilde{UA}_{i,j} = S_i^{UA} \times \frac{UA_{i,j}^{PART}}{r_{i,j}^{UA}}.$$

Once the data has been adjusted, the data can be grouped by campaign to determine impressions and unique audience for a campaign. The set of entities (e.g., media providers and/or advertising networks) belonging to a campaign is represented by $S_n$, where n is an index of the campaign. The estimated impressions for the campaign can be determined as $\tilde{I}_{S_n,j} = \Sigma_{i \in S_n} \tilde{I}_{i,j}$. When determining the unique audience for a campaign, duplication across sites may be recognized. Accordingly, for each demographic group j and campaign n, the campaign duplication factor is determined as $$d_{n,j} = \frac{UA_{S_n,j}^{PART}}{\sum_{i \in S_n} UA_{i,j}^{PART}}$$

where $d_{n,j}$ is less than 1. Accordingly, the unique audience estimation for the campaign is determined as:

$$\tilde{UA}_{S_n,j} = d_{n,j} \times \Sigma_{i \in S_n} \tilde{UA}_{i,j}.$$

While the foregoing examples describe particular equations for determining impressions and unique audience using calculated adjustment factors, any suitable equations may be used.

Figure 29:
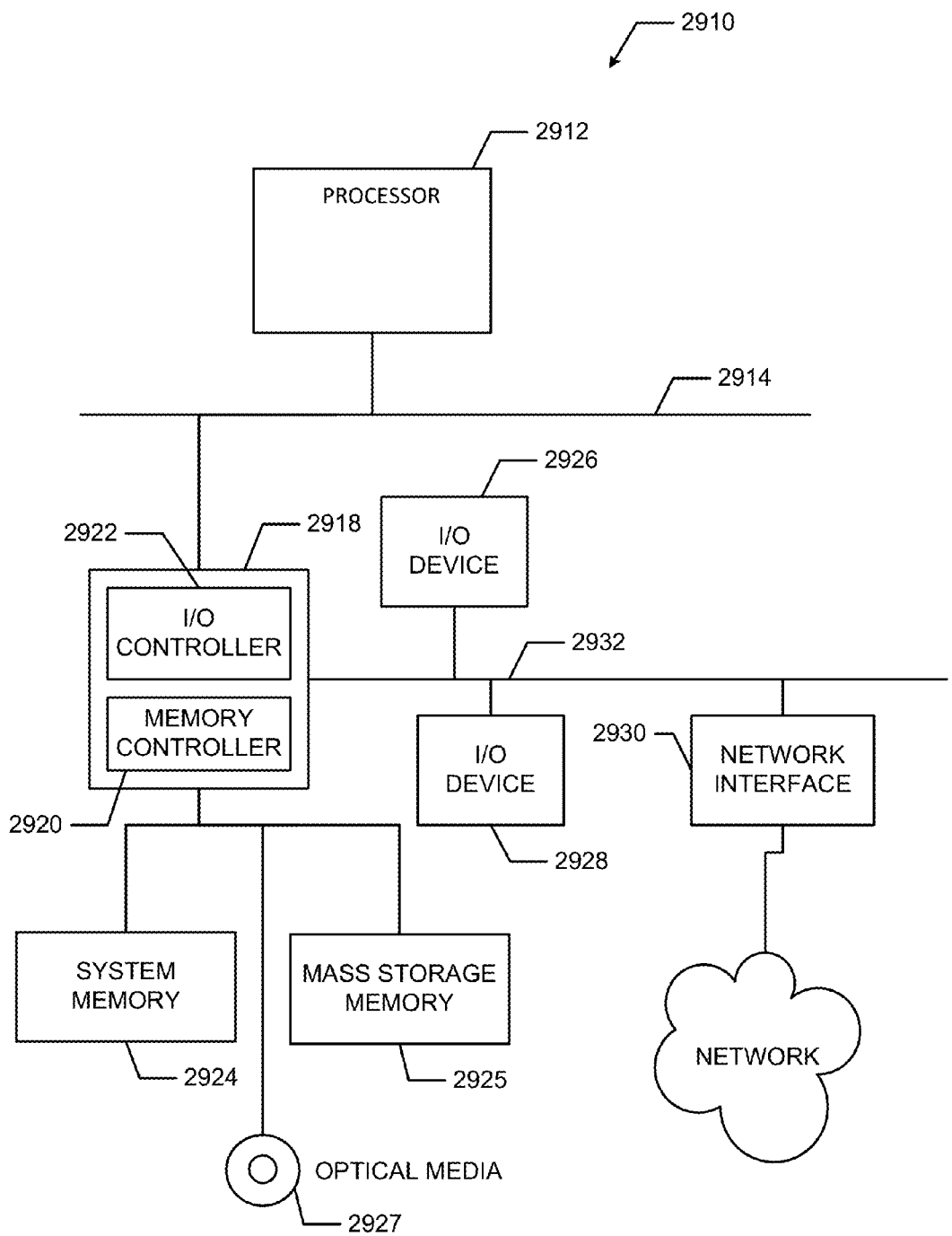
FIG. 29 is an example processor system that can be used to execute the example instructions of FIGS. 10-13 and/or 26-28 to implement the example apparatus and systems of FIGS. 1, 2, 3, 4, and/or 16.

FIG. 29 is a block diagram of an example processor system 2910 that may be used to implement the example apparatus, methods, and systems disclosed herein. As shown in FIG. 29, the processor system 2910 includes a processor 2912 that is coupled to an interconnection bus 2914. The processor 2912 may be any suitable processor, processing unit, or microprocessor. Although not shown in FIG. 29, the system 2910 may be a multi-processor system and, thus, may include one or more additional processors that are identical or similar to the processor 2912 and that are communicatively coupled to the interconnection bus 2914.

The processor 2912 of FIG. 29 is coupled to a chipset 2918, which includes a memory controller 2920 and an input/output (I/O) controller 2922. A chipset provides I/O and memory management functions as well as a plurality of general purpose and/or special purpose registers, timers, etc. that are accessible or used by one or more processors coupled to the chipset 2918. The memory controller 2920 performs functions that enable the processor 2912 (or processors if there are multiple processors) to access a system memory 2924, a mass storage memory 2925, and/or an optical media 2927.

In general, the system memory 2924 may include any desired type of volatile and/or non-volatile memory such as, for example, static random access memory (SRAM), dynamic random access memory (DRAM), flash memory, read-only memory (ROM), etc. The mass storage memory 2925 may include any desired type of mass storage device including hard disk drives, optical drives, tape storage devices, etc. The optical media 2927 may include any desired type of optical media such as a digital versatile disc (DVD), a compact disc (CD), or a blu-ray optical disc. The instructions of any of FIGS. 10-13 may be stored on any of the tangible media represented by the system memory 2924, the mass storage device 2925, the optical media 2927, and/or any other media.

The I/O controller 2922 performs functions that enable the processor 2912 to communicate with peripheral input/output (I/O) devices 2926 and 2928 and a network interface 2930 via an I/O bus 2932. The I/O devices 2926 and 2928 may be any desired type of I/O device such as, for example, a keyboard, a video display or monitor, a mouse, etc. The network interface 2930 may be, for example, an Ethernet device, an asynchronous transfer mode (ATM) device, an 802.11 device, a digital subscriber line (DSL) modem, a cable modem, a cellular modem, etc. that enables the processor system 2910 to communicate with another processor system.

While the memory controller 2920 and the I/O controller 2922 are depicted in FIG. 29 as separate functional blocks within the chipset 2918, the functions performed by these blocks may be integrated within a single semiconductor circuit or may be implemented using two or more separate integrated circuits.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. Accordingly, while the above describes example methods, apparatus, systems, and articles of manufacture, the examples provided are not the only ways to implement such methods, apparatus, systems, and articles of manufacture.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   determining an exposure of first media has occurred, the exposure occurring after a cookie identifier is received at a computing device, the cookie identifier received from a database proprietor;
   determining, via a processor, a first panelist identifier associated with the exposure based on the cookie identifier;
   determining, via the processor, a second panelist identifier associated with the exposure based on a determination of a user identity by a panelist meter associated with the computing device;
   determining, via the processor, an adjustment factor by comparing the first panelist identifier and the second panelist identifier;
   determining, via the processor, a number of exposures of second media from data logged by the database proprietor, the data logged in response to requests transmitted to the database proprietor in response to clients accessing the second media; and
   applying the adjustment factor to the number of exposures with the processor to determine an adjusted number of exposures.

2. The method of claim 1, wherein the second panelist identifier is different than the first panelist identifier.

3. The method of claim 1, wherein the determining of the adjustment factor by comparing the first panelist identifier and the second panelist identifier includes:
   incrementing a first count of exposures for a first demographic group associated with the first panelist identifier when the exposure is associated with the first panelist identifier;
   incrementing a second count of exposures for a second demographic group associated with the second panelist identifier when the exposure is associated with the second panelist identifier, the first demographic group and the second demographic group being the same; and
   dividing the first count by the second count to determine the adjustment factor.

4. The method of claim 3, wherein the second count is incremented based on exposures associated with a plurality of panelist meters including the panelist meter.

5. The method of claim 1, wherein the exposure occurs before detecting a second cookie identifier established by the database proprietor.

6. The method of claim 1, wherein the determining of the first panelist identifier includes:
   determining a plurality of computing sessions;
   determining the first panelist identifier associated with a first subset of the computing sessions;
   determining a third panelist identifier associated with a second subset of the computing sessions; and
   determining that the cookie identifier is associated with the first panelist identifier because the cookie identifier is established during the first subset of the computing sessions more frequently than the cookie identifier is established during the second subset of the computing sessions.

7. The method of claim 6, wherein the determining of the first panelist identifier further includes:
   determining a start of an estimated computing session based on a time at which the cookie identifier is established; and
   determining an end of an estimated computing session based on a time at which a second cookie identifier is established.

8. The method of claim 1, wherein the determining the exposure of the first media has occurred includes detecting that the first media was received at the computing device.

9. The method of claim 1, further including determining adjustment factors for each of a plurality of demographic groups, wherein applying the adjustment factor includes applying an adjustment factor for a demographic group to the number of exposures, the number of exposures determined for the demographic group.

10. The method of claim 1, further including:
determining a first media provider and a second media provider associated with a campaign, the adjustment associated with the first media provider;
determining a second adjustment factor;
multiplying the adjustment factor by a first number of exposures determined for the first media provider to determine a first adjusted number of exposures;
multiplying the second adjustment factor by a second number of exposures determined for the second media provider to determine a second adjusted number of exposures; and
adding the first adjusted number of exposures and the second adjusted number of exposures to determine an adjusted number of exposures for the campaign.

11. The method of claim 10, further including determining a proportion of campaign exposures associated with the first media provider, wherein the adjusted number of exposures for the campaign is determined based on the proportion of campaign exposures associated with the first media provider.

12. The method of claim 1, wherein the adjustment factor is indicative of a difference between a number of exposures calculated using a plurality of panelist meters and a number of exposures calculated by the database proprietor.

13. The method of claim 1, wherein the first media is the same as the second media.

14. An apparatus comprising:
a cookie to panelist matcher to determine a first panelist identifier associated with a cookie identifier received at a computing device, the cookie identifier received from a database proprietor;
a partner sessions pageview analyzer to determine that a first media exposure is associated with the first panelist based on the cookie identifier;
a panelist sessions pageview analyzer to determine that the first media exposure is associated with a second panelist identifier based on a determination of a user identity; and
an adjustment factor generator to compare the first panelist identifier and the second panelist identifier to determine an adjustment factor, determine a number of exposures of second media from data logged by the database proprietor, the data logged in response to requests transmitted to the database proprietor in response to clients accessing the second media, the adjustment factor generator to apply the adjustment factor to the number of exposures to determine an adjusted number of exposures.

15. The apparatus of claim 14, further including a panelist meter associated with the computing device to determine the user identity.

16. The apparatus of claim 14, wherein the second panelist identifier is different than the first panelist identifier.

17. The apparatus of claim 14, wherein:
the partner sessions pageview analyzer is to increment a first count of exposures for a first demographic group associated with the first panelist identifier when the exposure is associated with the first panelist identifier;
the panelist sessions pageview analyzer is to increment a second count of exposure for a second demographic group associated with the second panelist identifier when the exposure is associated with the second panelist identifier, the first demographic group and the second demographic group being the same; and
the adjustment factor generator is to compare the first panelist identifier and the second panelist identifier by dividing the first count by the second count to determine the adjustment factor.

18. The apparatus of claim 17, wherein the panelist sessions pageview analyzer is to increment the second count based on exposures associated with a plurality of panelist meters including the panelist meter.

19. The apparatus of claim 14, wherein the exposure occurs before the cookie to panelist matcher detects a second cookie identifier established by the database proprietor.

20. The apparatus of claim 14, wherein the partner sessions pageview analyzer is to determine the first panelist identifier by:
determining a plurality of computing sessions;
determining the first panelist identifier associated with a first subset of the computing sessions;
determining a third panelist identifier associated with a second subset of the computing sessions; and
determining that the cookie identifier is associated with the first panelist identifier because the cookie identifier is established during the first subset of the computing sessions more frequently than the cookie identifier is established during the second subset of the computing sessions.

21. The apparatus of claim 20, wherein the partner sessions pageview analyzer is further to determine the first panelist identifier by:
determining a start of an estimated computing session based on a time at which the cookie identifier is established; and
determining an end of an estimated computing session based on a time at which a second cookie identifier is established.

22. The apparatus of claim 14, wherein the cookie to panelist matcher is to determine the exposure of the first media has occurred by detecting that the first media was received at the computing device.

23. The apparatus of claim 14, wherein the adjustment factor generator is to determine adjustment factors for each of a plurality of demographic groups and is to apply the adjustment factor by applying the adjustment factor based on a demographic group associated with the number of exposures.

24. The apparatus of claim 14, wherein the adjustment factor generator is to:
determine a first media provider and a second media provider associated with a campaign, the adjustment factor associated with the first media provider;
determine a second adjustment factor;
multiply the adjustment factor by a first number of exposures determined for the first media provider to determine a first adjusted number of exposures;
multiply the second adjustment factor by a second number of exposures determined for the second media provider to determine a second adjusted number of exposures; and
add the first adjusted number of exposures and the second adjusted number of exposures to determine an adjusted number of exposures for the campaign.

25. The apparatus of claim 24, wherein the adjustment factor generator is to determine a proportion of campaign exposures associated with the first media provider and to determine the adjusted number of exposures for the campaign based on the proportion of campaign exposures associated with the first media provider.

26. The apparatus of claim 14, wherein the adjustment factor is indicative of a difference between a number of exposures calculated using a plurality of panelist meters and a number of exposures calculated by the database proprietor.

27. A tangible non-transitory computer readable medium comprising instructions that, when executed by a machine, cause the machine to at least:
   determine an exposure of first media has occurred, the exposure occurring after a cookie identifier is received at a computing device, the cookie identifier received from a database proprietor;
   determine, via a processor, a first panelist identifier associated with the exposure based on the cookie identifier;
   determine, via the processor, a second panelist identifier associated with the exposure based on a determination of a user identity by a panelist meter associated with the computing device;
   determine, via the processor, an adjustment factor by comparing the first panelist identifier and the second panelist identifier;
   determine, via the processor, a number of exposures of second media from data logged by the database proprietor, the data logged in response to requests transmitted to the database proprietor in response to clients accessing the second media; and
   apply the adjustment factor to the number of exposures to determine an adjusted number of exposures.

28. The tangible non-transitory computer readable medium of claim 27, wherein the second panelist identifier is different than the first panelist identifier.

29. The tangible non-transitory computer readable medium of claim 27, wherein the instructions, when executed, cause the machine to determine the adjustment factor by comparing the first panelist identifier and the second panelist identifier by:
   incrementing a first count of exposures for a first demographic group associated with the first panelist identifier when the exposure is associated with the first panelist identifier;
   incrementing a second count of exposures for a second demographic group associated with the second panelist identifier when the exposure is associated with the second panelist identifier, the first demographic group and the second demographic group being the same; and
   dividing the first count by the second count to determine the adjustment factor.

30. The tangible non-transitory computer readable medium of claim 29, wherein the second count is incremented based on exposures associated with a plurality of panelist meters including the panelist meter.

31. The tangible non-transitory computer readable medium of claim 27, wherein the exposure occurs before detecting a second cookie identifier established by the database proprietor.

32. The tangible non-transitory computer readable medium of claim 27, wherein the instructions, when executed, cause the machine to determine the first panelist identifier by:
   determining a plurality of computing sessions;
   determining the first panelist identifier associated with a first subset of the computing sessions;
   determining a third panelist identifier associated with a second subset of the computing sessions; and
   determining that the cookie identifier is associated with the first panelist identifier because the cookie identifier is established during the first subset of the computing sessions more frequently than the cookie identifier is established during the second subset of the computing sessions.

33. The tangible non-transitory computer readable medium of claim 32, wherein the instructions, when executed, cause the machine to determine the first panelist identifier further by:
   determining a start of an estimated computing session based on a time at which the cookie identifier is established; and
   determining an end of an estimated computing session based on a time at which a second cookie identifier is established.

34. The tangible non-transitory computer readable medium of claim 27, wherein the instructions, when executed, cause the machine to determine the exposure of the first media has occurred by detecting that the first media was received at the computing device.

35. The tangible non-transitory computer readable medium of claim 27, wherein the instructions, when executed, cause the machine to:
   determine adjustment factors for each of a plurality of demographic groups; and
   apply the adjustment factor by applying an adjustment factor for a demographic group to the number of exposures, the number of exposures determine for the demographic group.

36. The tangible non-transitory computer readable medium of claim 27, wherein the instructions, when executed, cause the machine to:
   determine a first media provider and a second media provider associated with a campaign, the adjustment factor associated with the first media provider;
   determine a second adjustment factor;
   multiply the adjustment factor by a first number of exposures determined for the first media provider to determine a first adjusted number of exposures;
   multiply the second adjustment factor by a second number of exposures determined for the second media provider to determine a second adjusted number of exposures; and
   add the first adjusted number of exposures and the second adjusted number of exposures to determine an adjusted number of exposures for the campaign.

37. The tangible non-transitory computer readable medium of claim 36, wherein the instructions, when executed, cause the machine to:
   determine a proportion of campaign exposures associated with the first media provider; and
   determine the adjusted number of exposures for the campaign based on the proportion of campaign exposures associated with the first media provider.

38. The tangible non-transitory computer readable medium of claim 27, wherein the adjustment factor is indicative of a difference between a number of exposures calculated using a plurality of panelist meters and a number of exposures calculated by the database proprietor.

39. The tangible non-transitory computer readable medium of claim 27, wherein the first media is the same as the second media.

* * * * *